United States Patent
Olsson et al.

(10) Patent No.: US 9,746,572 B2
(45) Date of Patent: Aug. 29, 2017

(54) ELECTRONIC MARKER DEVICES AND SYSTEMS

(71) Applicants: Mark S. Olsson, La Jolla, CA (US); Stephanie M. Bench, Carlsbad, CA (US); Ray Merewether, La Jolla, CA (US); Jan Soukup, San Diego, CA (US)

(72) Inventors: Mark S. Olsson, La Jolla, CA (US); Stephanie M. Bench, Carlsbad, CA (US); Ray Merewether, La Jolla, CA (US); Jan Soukup, San Diego, CA (US)

(73) Assignee: Seescan, Inc., San Diego, CA (US)

( * ) Notice: Subject to any disclaimer, the term of this patent is extended or adjusted under 35 U.S.C. 154(b) by 211 days.

(21) Appl. No.: 14/516,558

(22) Filed: Oct. 16, 2014

(65) Prior Publication Data

US 2015/0123664 A1    May 7, 2015

Related U.S. Application Data

(60) Provisional application No. 61/892,236, filed on Oct. 17, 2013.

(51) Int. Cl.
| | | |
|---|---|---|
| *G01N 3/08* | (2006.01) | |
| *G01V 3/08* | (2006.01) | |
| *G01V 3/15* | (2006.01) | |
| *G01V 15/00* | (2006.01) | |

(52) U.S. Cl.
CPC ............ *G01V 3/081* (2013.01); *G01V 3/15* (2013.01); *G01V 15/00* (2013.01)

(58) Field of Classification Search
CPC . G01V 3/15; G01V 3/81; G01V 3/102; G01V 3/101; E21B 47/224
USPC .................................................. 324/323, 326
See application file for complete search history.

(56) References Cited

U.S. PATENT DOCUMENTS

| | | | |
|---|---|---|---|
| 4,712,094 A | 12/1987 | Bolson, Sr. | |
| 4,761,656 A | 8/1988 | Cosman et al. | |
| 4,791,412 A | 12/1988 | Brooks | |
| 5,361,029 A * | 11/1994 | Rider ................... | G01R 31/023 324/326 |
| 5,625,341 A * | 4/1997 | Giles .................. | G08B 13/2431 340/10.34 |
| 5,644,237 A * | 7/1997 | Eslambolchi ............ | G01V 3/02 324/326 |
| 5,792,337 A * | 8/1998 | Padovani ............... | G01N 17/02 205/775.5 |
| 5,920,194 A | 7/1999 | Lewis et al. | |

(Continued)

FOREIGN PATENT DOCUMENTS

| | | |
|---|---|---|
| EP | 0688438 | 12/1995 |
| WO | PCT/US03/069374 | 8/2003 |

(Continued)

*Primary Examiner* — Tung X Nguyen
*Assistant Examiner* — Dominic Hawkins
(74) *Attorney, Agent, or Firm* — Steven C. Tietsworth, Esq.

(57) ABSTRACT

Integrated buried utility locator systems, including a locator including a marker device excitation transmitter a buried utility locator along with one or more marker devices, are disclosed. In operation a marker device excitation signal is sent from the locator at least partially simultaneously to receiving and processing a buried utility signal.

26 Claims, 20 Drawing Sheets

(56) References Cited

U.S. PATENT DOCUMENTS

| | | | |
|---|---|---|---|
| 6,356,082 B1* | 3/2002 | Alkire | G01V 3/06 324/326 |
| 6,377,203 B1* | 4/2002 | Doany | G06K 7/0008 340/10.1 |
| 6,388,575 B1 | 5/2002 | Galloway | |
| 6,617,856 B1 | 9/2003 | Royle et al. | |
| 6,690,741 B1* | 2/2004 | Larrick, Jr. | H04L 27/04 375/130 |
| 6,785,618 B2* | 8/2004 | Kechter | G01M 3/243 702/39 |
| 6,927,698 B2* | 8/2005 | Stolarczyk | G01V 3/30 166/250.01 |
| 6,954,072 B1* | 10/2005 | Schlapp | G01V 3/15 324/329 |
| 7,113,124 B2* | 9/2006 | Waite | G01V 3/12 324/326 |
| 7,285,958 B2* | 10/2007 | Overby | G01V 15/00 324/326 |
| 7,969,137 B2* | 6/2011 | Royle | G01V 3/081 324/329 |
| 8,013,610 B1 | 9/2011 | Merewether et al. | |
| 8,280,631 B2* | 10/2012 | Nielsen | G06Q 10/06 118/75 |
| 8,442,766 B2* | 5/2013 | Nielsen | G06Q 10/06 324/67 |
| 8,727,217 B2 | 5/2014 | Balachandran et al. | |
| 8,965,700 B2* | 2/2015 | Nielsen | G06Q 10/06 702/5 |
| 9,000,778 B2* | 4/2015 | Ziolkowski | F17D 5/00 324/600 |
| 2004/0070502 A1* | 4/2004 | Tyren | G01V 15/00 340/572.6 |
| 2007/0126421 A1* | 6/2007 | Barnes | G01M 3/18 324/238 |
| 2009/0109049 A1* | 4/2009 | Frederick | F16P 3/14 340/686.6 |
| 2011/0109437 A1* | 5/2011 | Olsson | G01V 3/15 340/8.1 |
| 2013/0127358 A1* | 5/2013 | Yao | H05B 33/0815 315/201 |
| 2014/0312904 A1* | 10/2014 | Mizuno | G01V 3/104 324/326 |
| 2014/0340086 A1* | 11/2014 | Olsson | G01V 3/38 324/326 |
| 2017/0017009 A1* | 1/2017 | Olsson | G01V 3/15 324/326 |

FOREIGN PATENT DOCUMENTS

| | | |
|---|---|---|
| WO | PCT/US07/257800 | 11/2007 |
| WO | PCT/US13/033924 | 3/2013 |
| WO | PCT/US13/099790 | 4/2013 |
| WO | PCT/US13/148714 | 10/2013 |

* cited by examiner

ELECTRONIC MARKER DEVICES AND SYSTEMS

CROSS-REFERENCE TO RELATED APPLICATIONS

This application claims priority under 35 U.S.C. §119(e) to U.S. Provisional Patent Application Ser. No. 61/892,236, entitled ELECTRONIC MARKER DEVICES AND SYSTEMS, filed Oct. 17, 2013, the content of which is hereby incorporated by reference herein in its entirety for all purposes.

FIELD

This disclosure relates generally to apparatus, systems, and methods for locating hidden or buried utilities or objects. More specifically, but not exclusively, the disclosure relates electronic marker devices that may be used in conjunction with integrated electromagnetic utility locators to simultaneously detect buried utilities, send marker device excitation signals, and/or receiver marker device signals.

BACKGROUND

With the evolution of more complex utility infrastructures requiring enhancement, replacement, and expansion in many areas of human use or occupation, and in particular high-density areas such as cities and suburbs, the ability to accurately map the location of buried utilities such as conduits, wires and pipelines of various sizes and types becomes more pressing, as does the need to document actual as-built underground utility installations before they are covered so that they can be precisely located at a later date.

Worker safety and economic concerns also require the location and identification of existing underground utilities such as underground power lines, gas lines, phone lines, fiber optic cable conduits, cable television (CATV) cables, sprinkler control wiring, water pipes, sewer pipes and the like, which are collectively and individually referred to herein as "buried objects" or "buried utilities."

The unintended destruction of power and data cables can seriously disrupt the comfort and convenience of residents, and can cause huge financial costs to businesses. Breakage of gas lines can cause likewise cause economic harm as well as serious personal injury or death. Therefore human-portable buried object locators (also denoted herein for brevity as "utility locators" or simply "locators") have been developed to locate buried utilities by sensing electromagnetic signals, typically magnetic fields, emitted by the utilities due to currents flowing in them.

Buried objects are frequently located by utility employees or other uses by moving a utility locator over the ground or other areas where a utility is suspected of being present. The locator is moved over the ground or other surface by an operator, and receives and processes electromagnetic signals emitted from the utilities to determine, for example, information about the buried utilities' position underground and relative to the ground surface (e.g., in relative terms with respect to the user and/or in geographic latitude/longitude or other coordinate systems), depth below ground, utility type, multiple utility configurations (when more than one utility is present) and the like. These operations are commonly known in the art as "line tracing" or "locates."

If the buried utilities are conductors that carry their own electrical signal, such as electrical power lines, they can be traced by detecting the emitted signals at their corresponding frequency or frequencies, such as 50 or 60 Hz or harmonics thereof for underground power lines, also known as "passive locating." Signals with a known frequency may also be applied to pipes and cables via a device known as a "locate transmitter" or "transmitter" for short, which may be directly, inductively, or capacitively coupled to the utility to enhance the ease and accuracy of the line tracing operation, also known as "active locating." In some operations, a device known as a sonde, which includes a magnetic dipole antenna and current signal generation module, is inserted into a pipe, conduit or other cavity and generates a magnetic field signal that can be detected by a locator. During these operations it is desirable to track the position and location of the locator or other device throughout its movement, either in relative coordinates, absolute coordinates or both.

Portable utility locators typically carry one or more antennas that are used to detect the electromagnetic signals emitted by buried utilities and by sondes that have been inserted into pipes or other cavities. In addition, some underground utility installations use devices known as marker balls, which are commonly in the shape of a sphere and function by receiving electromagnetic energy emitted from a standalone dedicated transmitter device and generate return signals indicating their presence. These marker balls are placed in the ground to provide an additional way to identify hidden objects by receiving a dedicated signal from them, which is typically initiated by a separate pulsed transmission to the device to provide RF energy for powering the marker ball. In existing systems, the transmit and receive frequencies in marker ball systems are typically the same for the pulsed excitation or "ping" and the return signal from the marker ball.

In addition, other similar electromagnetic identification devices are used for other applications, such as radio frequency identification (RFID) tags used to track inventory or merchandise and the like. These marker ball and RFID devices all require dedicated transmitters to send electromagnetic energy to the ball or tags to energize them so they can respond. In these systems, the transmit signals are typically sent in pulses because the return signal is on the same frequency and the transmit signal would overload the receiver input of any device attempting to sense the much lower signal levels from the marker ball or RFID device.

Because of various problems related to signal transmission and reception in single devices as developed in the art, no systems have been developed to integrate marker transmitters functionality with associated marker devices and corresponding locators to provide an integrated solution that allows for simultaneous detection of marker devices while excitation signals are being sent (e.g., excitation signals in these devices are sent in a pulsed or on-off fashion so that the excitation transmissions are turned off during time intervals when signals from the marker balls or buried utilities are being received). Moreover, existing marker ball devices typically trade off size for power, range, and/or data capability, and tend to be relatively expensive.

Accordingly, there is a need in the art to address the above-described as well as other problems related to marker devices and associated locator systems.

SUMMARY

This disclosure relates generally to apparatus, systems, and methods for locating hidden or buried objects. For example, in one aspect, the disclosure relates to apparatus, systems, and methods for locating buried utilities in conjunction with associated electromagnetic marker devices, which may be used in conjunction with integrated electromagnetic utility locators to simultaneously detect buried utilities and send marker device excitation signals. Integrated locators are locators configured to receive signals from marker devices and/or buried utilities while excitation signals are simultaneously being sent from a marker ball excitation device that may be integrated with or operated in conjunction with the locator.

In another aspect, the disclosure relates to an integrated buried utility locator system. The system may include, for example, a marker device excitation transmitter module, which may be configured for generating and sending a marker device excitation signal at a marker device excitation signal frequency. The system may further include a front end subsystem. The front end system may be configured to receive a signal from a buried utility, and/or a reply signal from a marker device responsive to the excitation signal. The system may further include a processing element. The processing element may be configured for processing the received buried utility signals and/or marker device signals and generating information associated with the buried utility and the marker device based at least in part on the received buried utility signal and/or marker device reply signal. The system may further include a memory for storing the information associated with the buried utility and the marker device. The marker device excitation signal may be sent at least partially simultaneously to receiving the buried utility signal. The marker device excitation signal may be sent in a continuous or substantially continuous fashion during the duration or powering of the system or during a subset of the system operating interval. Data and/or other information or signal coding or modulation may be included in the excitation signal.

In another aspect, the disclosure relates to a marker device excitation transmitter module. The transmitter module may, in combination with a receiver or front end module, be part of a marker device excitation transceiver module or may be integrated or coupled to a utility locator in an integrated locator configuration. The transmitter module may include an output signal oscillator circuit, a coil antenna, and a tank circuit coupled in series to the coil antenna and the oscillator circuit. The tank circuit may be configured to increase the quality factor ("Q") of the coil antenna at or near the marker device excitation signal frequency.

In another aspect, the disclosure relates to a marker device. The marker device may be used in conjunction with an integrated utility locator or a marker device excitation transmitter or transceiver. The marker device may, for example, include an antenna for receiving an excitation signal at an excitation signal frequency and sending a reply signal at a reply signal frequency. The marker device may include an input module coupled to the antenna. The marker device may include a clock circuit coupled to the input module to generate a clock signal at a frequency synchronized to the received excitation signal. The marker device may include a power supply circuit coupled to the input module to generate an output power signal from the received excitation signal. The marker device may include a processing element for generating an output signal at an output signal frequency different from the excitation signal frequency. The marker device may include an output module for receiving the output signal from the processing element and providing the output signal to the antenna for transmission.

In another aspect, the disclosure relates to a method for performing a locate operation with a device. The method may include, for example, sending, from an excitation transmitter module, an excitation signal for powering a marker device and receiving, simultaneous to at least part of the sending an excitation signal, in a front end subsystem, a signal from one or more of 1) a buried utility and 2) a reply signal from a marker device powered by the excitation signal. The method may further include determining, in a processing element, information associated with the buried utility magnetic field signal, the reply signal, or both. The method may further include storing the determined information in a memory.

In another aspect, the disclosure relates to methods for implementing integrated locators, marker device excitation transceivers, and/or marker devices and systems, in whole or in part.

In another aspect, the disclosure relates to means for implementing the above-described methods and/or system or device functions, in whole or in part.

In another aspect, the disclosure relates to instructions stored on a non-transitory medium for implementing the above-described apparatus, systems, or methods in a processing element, in whole or in part.

Various additional aspects, features, and functionality are further described below in conjunction with the appended Drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

Figure 1A:
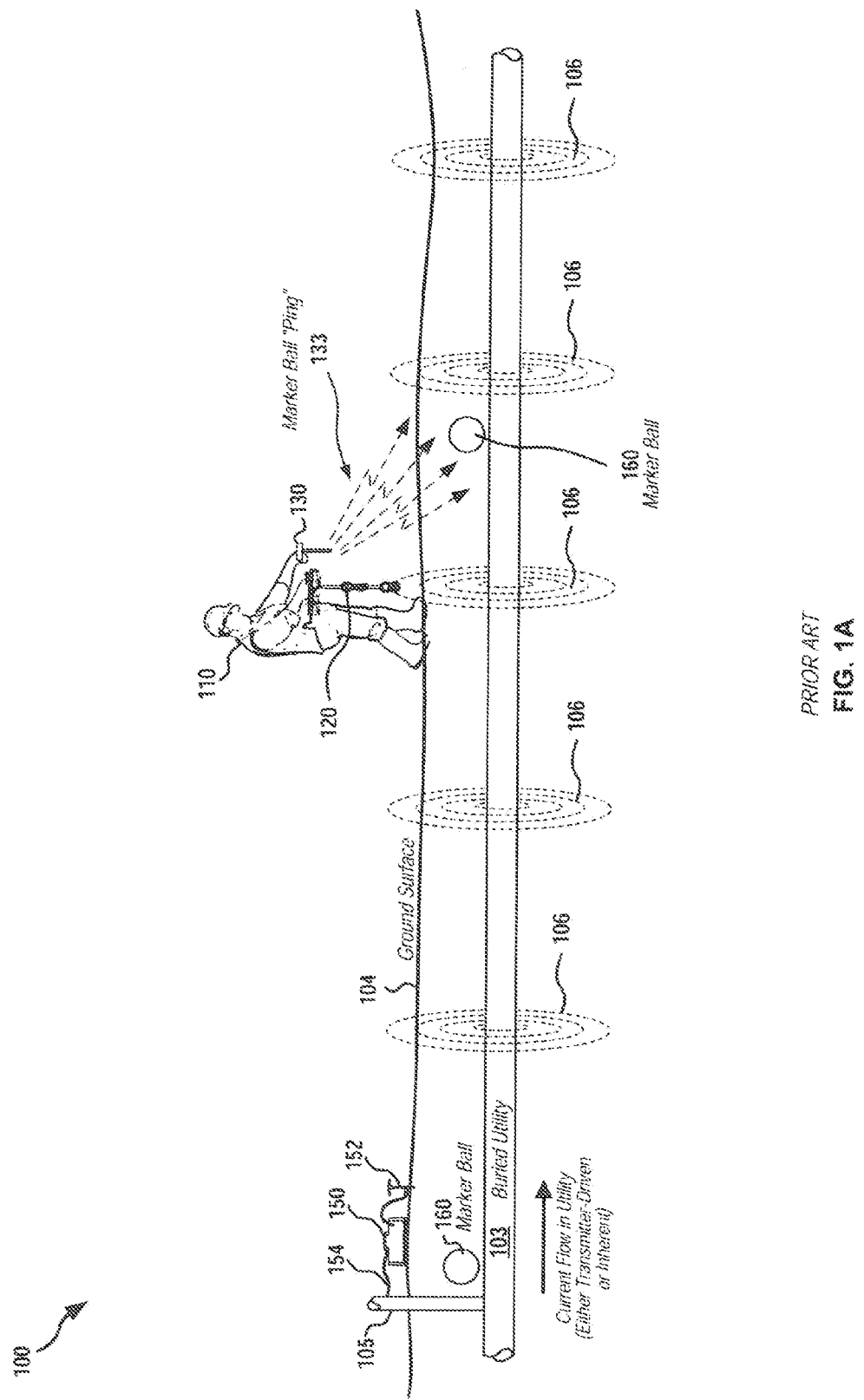
FIG. 1A is an illustration of a prior art marker ball system with an underground utility, buried marker balls, and an operator using a separate utility locator and marker ball transceiver device to ping the marker balls.

Various aspects as described herein may be combined in additional embodiments with the utility locator and related devices, systems and methods as described in co-assigned patent applications including U.S. patent application Ser. No. 13/766,670, entitled OPTICAL GROUND TRACKING APPARATUS, SYSTEMS, AND METHODS, filed on Feb. 13, 2013, U.S. patent application Ser. No. 13/469,024, entitled BURIED OBJECT LOCATOR APPARATUS AND SYSTEMS, filed on May 10, 2012, U.S. patent application Ser. No. 12/016,870, entitled RECONFIGURABLE PORTABLE LOCATOR EMPLOYING MULTIPLE SENSOR ARRAY HAVING FLEXIBLE NESTED ORTHOGONAL ANTENNAS, filed on Jan. 18, 2008, now U.S. Pat. No. 7,518,374, U.S. patent application Ser. No. 11/970,818, entitled MULTI-SENSOR MAPPING OMNIDIRECTIONAL SONDE AND LINE LOCATORS, filed on Jan. 8, 2008, now U.S. Pat. No. 7,443,154, U.S. patent application Ser. No. 11/077,947, entitled SINGLE AND MULTI-TRACE OMNIDIRECTIONAL SONDE AND LINE LOCATORS AND TRANSMITTERS USED THEREWITH, filed on Mar. 11, 2005, now U.S. Pat. No. 7,619,516, and U.S. patent application Ser. No. 10/268,641, entitled OMNIDIRECTIONAL SONDE AND LINE LOCATOR, filed on Oct. 9, 2002, now U.S. Pat. No. 7,009,399. The content of each of the above-described applications is hereby incorporated by reference herein in its entirety. The above applications may be collectively denoted herein for brevity as the "co-assigned applications" or "incorporated applications."

As used herein, the term "buried objects" includes objects or utilities located inside walls, between floors in multi-story buildings or cast into concrete slabs, for example, as well as objects disposed below the surface of the ground. In a typical application a buried object is a pipe, cable, conduit, wire, or other object buried under the ground surface, at a depth of from a few centimeters to meters or more, that a user, such as a utility company employee, construction company employee, homeowner or others want to locate, map (e.g., by surface position as defined by latitude/longitude or other surface coordinates, and/or also by depth), measure, and/or provide a surface mark corresponding to it using paint, electronic marking techniques, images, video or other identification or mapping techniques.

This disclosure relates generally to apparatus, systems, and methods for locating hidden or buried objects. For example, in one aspect, the disclosure relates to apparatus, systems, and methods for locating buried utilities in conjunction with associated electromagnetic marker devices, which may be used in conjunction with integrated electromagnetic utility locators to simultaneously detect buried utilities and send marker device excitation signals. Integrated locators are locators configured to receive signals from marker devices and/or buried utilities while excitation signals are simultaneously being sent from a marker ball excitation device that may be integrated with or operated in conjunction with the locator.

In another aspect, the disclosure relates to an integrated buried utility locator system. The system may include, for example, a marker device excitation transmitter module, which may be configured for generating and sending a marker device excitation signal at a marker device excitation signal frequency. The system may further include a front end subsystem. The front end system may be configured to receive a signal from a buried utility, and/or a reply signal from a marker device responsive to the excitation signal. The system may further include a processing element. The processing element may be configured for processing the received buried utility signals and/or marker device signals and generating information associated with the buried utility and the marker device based at least in part on the received buried utility signal and/or marker device reply signal. The system may further include a memory for storing the information associated with the buried utility and the marker device. The marker device excitation signal may be sent at least partially simultaneously to receiving the buried utility signal. The marker device excitation signal may be sent in a continuous or substantially continuous fashion during the duration or powering of the system or during a subset of the system operating interval. Data and/or other information or signal coding or modulation may be included in the excitation signal.

The marker device excitation signal may, for example, be sent at a first frequency, and the marker device reply signal is received at a second frequency substantially different from the first frequency. The first frequency and the second frequency may be synchronized with each other. The first and second frequencies may be related by an integer multiple or divisor.

The front end subsystem may, for example, include antennas and analog or digital electronics to receive and process utility generated magnetic field signals and/or marker device reply signals. The front end subsystem may include an antenna coil and a circuit coupled to the output terminal of the antenna coils. The circuit coupled to the output of the antenna coils may be configured to present substantially a short circuit at the marker device excitation signal frequency and/or other frequencies of actual or potentially interfering signals. The circuit coupled to the output terminals of the antenna coils may include a series LC circuit coupled across the output terminals.

The system may, for example, further include a positioning system module configured to generate output data corresponding to a location or position of the system, such as the location of an integrated locator marker device excitation transceiver. The positioning system module may be a satellite positioning system module. The positioning system module may be a terrestrial-based positioning system module. The positioning system module may be an inertial-based positioning system module. The satellite positioning system module may be a GPS module, Galileo system module, GLONASS module, or other satellite-based positioning system module.

The system may, for example, include a display element, such as an LCD or other visual display device. The display may be configured to display information associated with the buried utility and/or information associated with the marker device. The displayed information may include one or more of buried utility depth, buried utility location (e.g., relative to the ground and/or earth-based coordinates such as latitude/longitude, tilt, presence of multiple utilities, current flow, etc.), marker device serial number or device identification number, other data provided from the marker device, such as position data or environmental condition data, and/or other information associated with the buried utility and/or marker device. The system may further include an audible output element, such as a speaker, headphones and headphone jacks/connectors, buzzers, or other audible output elements.

The marker device excitation transmitter module may, for example, include an output signal oscillator circuit, a coil antenna, and a tank circuit coupled in series to the coil antenna and the oscillator circuit. The tank circuit may be configured to increase the Q of the coil antenna at the marker device excitation signal frequency. The tank circuit may include an inductor having an inductance of approximately an order of magnitude or more than the inductance of the antenna coil at the marker device excitation frequency. The tank circuit may include a capacitor in series with the inductor. The capacitor and inductor may be tuned to resonance, in conjunction with the antenna inductance, at approximately the marker device excitation frequency.

In another aspect, the disclosure relates to a marker device excitation transmitter module. The transmitter module may, in combination with a receiver or front end module, be part of a marker device excitation transceiver module or may be integrated or coupled to a utility locator in an integrated locator configuration. The transmitter module may include an output signal oscillator circuit, a coil antenna, and a tank circuit coupled in series to the coil antenna and the oscillator circuit. The tank circuit may be configured to increase the quality factor ("Q") of the coil antenna at or near the marker device excitation signal frequency.

The tank circuit may, for example, include an inductor having an inductance of approximately an order of magnitude or more than the inductance of the antenna coil at the marker device excitation frequency. The tank circuit may include a capacitor in series with the inductor. The capacitor and inductor may be tuned to resonance, in conjunction with the antenna inductance, at approximately the marker device excitation frequency.

In another aspect, the disclosure relates to a marker device. The marker device may be used in conjunction with an integrated utility locator or a marker device excitation transmitter or transceiver. The marker device may, for example, include an antenna for receiving an excitation signal at an excitation signal frequency and sending a reply signal at a reply signal frequency. The marker device may include an input module coupled to the antenna. The marker device may include a clock circuit coupled to the input module to generate a clock signal at a frequency synchronized to the received excitation signal. The marker device may include a power supply circuit coupled to the input module to generate an output power signal from the received excitation signal. The marker device may include a processing element for generating an output signal at an output signal frequency different from the excitation signal frequency. The marker device may include an output module for receiving the output signal from the processing element and providing the output signal to the antenna for transmission.

The antenna may, for example, be a coil antenna having two outputs and the input module may include an LC tank circuit coupled across the output of the antenna coil. The clock circuit may include a parallel LC circuit in series with a first capacitor and a second capacitor. The power supply circuit may include a diode and a filter capacitor. The processing element may include one or more microcontrollers having programmed instructions to generate the output signal. The memory may be included in or coupled to the microcontroller. The programmed instructions may include instructions to generate a modulated output signal. The output signal may be generated at a frequency that is an integer multiple or divisor of the frequency of a received excitation signal. The output signal may be modulated. The modulated output signal may be phase shift keying (PSK) signal modulated with data. The modulated output signal may be an amplitude shift keying (ASK) signal modulated with data. The modulated output signal may be modulated using another modulation method, such as AM, FSK, or other modulation methods known or developed in the art. The data may include a serial number of the marker device. The data may include data defining a location or position of the marker device. The output circuit may include a tank circuit tuned to approximately the output frequency.

In another aspect, the disclosure relates to a method for performing a locate operation with a device. The method may include, for example, sending, from an excitation transmitter module, an excitation signal for powering a marker device and receiving, simultaneous to at least part of the sending an excitation signal, in a front end subsystem, a signal from one or more of 1) a buried utility and 2) a reply signal from a marker device powered by the excitation signal. The method may further include determining, in a processing element, information associated with the buried utility magnetic field signal, the reply signal, or both. The method may further include storing the determined information in a memory.

The device may, for example, be a utility locator, and the excitation transmitter module may be integrated with the utility locator. The receiving, determining, and/or storing may be performed in the utility locator. The device may be a utility locator and the excitation transmitter module may be coupled to, rather than integrated with, the utility locator. The receiving, determining, and/or storing may be performed at least in part in the utility locator.

The device may, for example, be a marker device excitation transceiver. The sending, receiving, determining, and/or storing may be performed in one or more modules of the marker device excitation transceiver.

The receiving may, for example, include receiving a buried utility magnetic field signal. The determining information may include determining a depth of the buried utility. The determining information may include determining a position, relative to the ground surface, of the buried utility. The method may further include receiving a positioning system signal and determining a location of the device, such as with earth-based coordinates such as latitude/longitude coordinates. The associating may further include associating the determined information with the location of the device.

The receiving may, for example, include receiving a marker device reply signal. The determining information may include determining a serial number of device identification number.

The receiving may, for example, include receiving a buried utility magnetic field signal, and the determining information may include one or both of determining a depth of the buried utility and determining a position, relative to the ground surface, of the buried utility. The receiving may further include receiving a marker device reply signal, and the determining information may further include determining a serial number or a device identification number of the marker device.

The method may, for example, further include providing, on a display of the device, at least a portion of the determined information. The display may include displayed information on a graphical user interface (GUI). The displayed information may include a depiction of the buried utility, a depth of the buried utility, location of a marker device, serial number or device ID of the marker device, and/or other information associated with the buried utility and/or marker device.

The method may, for example, further include sending, from the device, the determined information to another device. The sending may be via a wired or wireless communications link. The sending may be done from a wired or wireless communications module or module in a locator or marker device excitation transceiver. The wired or wireless communications link may be one or more of a USB connection, a Wi-Fi connection, an Ethernet connection, a cellular data connection, and an ISM connection using a corresponding module or modules. The another device may be a cellular phone or other cellular data transceiver device. The another device may be a remote computer server system. The another device may be a notebook computer or tablet device. The another device may be a mobile base station.

In another aspect, the disclosure relates to methods for implementing integrated locators, marker device excitation transceivers, and/or marker devices and systems, in whole or in part.

In another aspect, the disclosure relates to means for implementing the above-described methods and/or system or device functions, in whole or in part.

In another aspect, the disclosure relates to instructions stored on a non-transitory medium for implementing the above-described apparatus, systems, or methods, in whole or in part.

Various additional aspects, features, and functionality are further described below in conjunction with the appended Drawings.

Figure 1B:
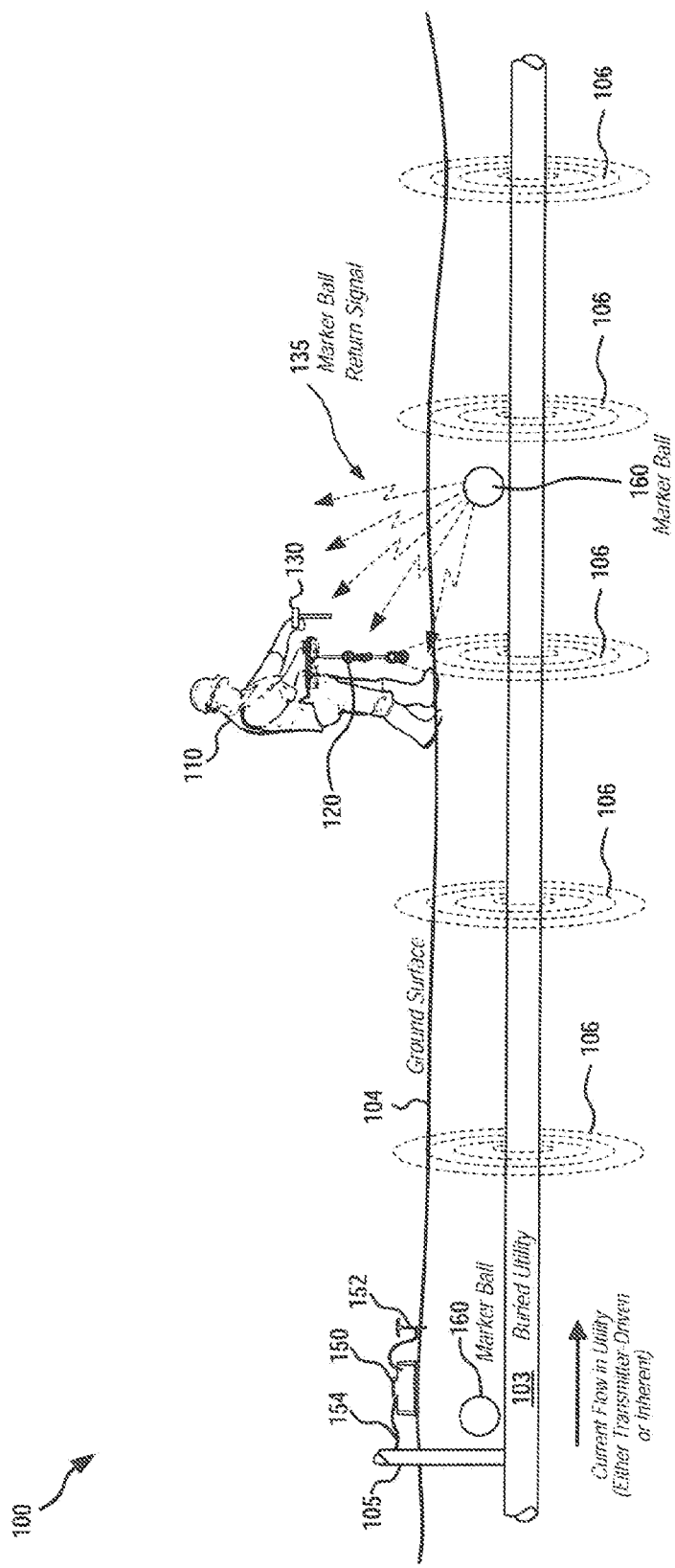
FIG. 1B is an illustration of additional details of the system of FIG. 1A showing a return transmission from the buried marker ball to the marker ball transceiver device.

Attention is now directed to FIG. 1A and FIG. 1B, which illustrate a locate operation using marker balls 160 in an example prior art marker ball-based system configuration 100. In FIG. 1A, a user or operator 110 is at a field location where one or more hidden or buried utilities, such as buried utility 103 (in the form of a pipe) is located, in this case under a ground surface 104, which may be below a roadway, in a yard or field or at some other location. The ground surface may be dirt or grass, a paved surface, a sidewalk, a building floor, and the like. An operator uses a utility locator 120 to find the buried utility, with the locator 120 operating by sensing magnetic field signals 106 emitted from the buried utility 103.

The buried utility may inherently generate a magnetic field signal (e.g., due to normal current flow in a conductor, such as in a buried power line, or in some other conductor carrying an induced current) or may optionally have a current flow coupled to it through use of a device known as a utility transmitter, such as transmitter 150 and the associated transmitter subsystem as shown. The optional transmitter subsystem may include a utility transmitter device 150, which generates an output current signal for coupling to one or more utilities at a desired frequency or frequencies with a predefined waveform or waveforms. The return current may be carried via a stake 152 or other coupling mechanism. For example, output current from the transmitter may be coupled to the utility 103 through direct electrical coupling, such as via a connection 154 as shown to a pipe 105, or inductively or capacitively through a coupling circuit such as an inductive coupling coil or other circuit (not shown), such as an inductive stick device. In some operations, current signals that generate magnetic field signals detectable by a utility locator may be induced in the utility via overhead or underground power lines, radio signals, or other electromagnetic field sources.

Current flowing in the utility 103 generates corresponding magnetic field signals 106, which are detected by the utility locator 120 using one or more magnetic field antenna coils (typically in the form of two or more antenna arrays, such as antenna arrays including omnidirectional and/or gradient antenna coils). The received signals are then processed by one or more processing elements in the locator to determine information associated with the buried utility such as its depth, location (relative to the ground surface), current flow in the utility, presence of other utilities or conductive objects, and the like. Additional information, such as location or position information (e.g., from a GPS or other satellite or terrestrial positioning system signal, inertial positioning elements, and the like) may be associated with information about the buried object determined by the utility locator and stored in the locator and/or sent to other electronic devices or systems.

The processed information may be stored in a memory and/or presented to a user on a visual and/or audible output device, such as an LCD panel, speaker or buzzer, and the like. Details of various aspects of locators and associated elements and systems are described in the various incorporated applications.

As noted above, the utility locator 120 may include ground tracking elements to track movement of the locator over the ground surface 104, which may be, for example, satellite navigation based (e.g., in the form of a GPS module or modules disposed in or coupled to the locator, transmitter, or other associated device(s)), inertial based (e.g., in the form of a compass sensor, accelerometers, or other inertial navigation sensor disposed in or coupled to the locator), optically based (e.g., in the form of an optical ground tracking subsystem as described in the incorporated applications), and the like. Detected locate information may be associated with location/position data and stored in a memory of the locator device, displayed on a display of the device and/or output to the user in an audible or other fashion, and/or sent to an external device or system for later processing and/or use.

In order to provide additional locate capability in some systems, marker balls, such as the two marker balls 160 as shown, may be buried below the ground surface, typically matched to or associated with the buried utility. Further, in some installations the marker balls may be placed on or under the ground in other locations and/or in other objects or structures for various marking applications.

In the locate operation shown in FIG. 1A and FIG. 1B, an operator 110 is equipped with a separate locator 120 and marker ball transceiver device 130 as shown; however, some currently available devices combine the locator and marker ball transceiver functionality in a single unit (e.g., some or all of the functionality of locator 120 and marker ball transceiver 130 are combined in some current implementations). In the example shown, these two devices are not configured to communicate or coordinate operations, and both operate, in this scenario, as standalone devices. However, existing devices, whether they are standalone or integrated, do not allow simultaneous transmission of excitation signals while reply signals or utility emissions are being received. This requires, in existing devices, that the transmissions be pulsed or non-continuous so that a quiet time between transmissions is provided to allow the receiver element to receive reply signals and/or utility emissions.

The locator 120 as shown may be any of the various locator devices as are known in the art. For example, the locators may be configured as described in the incorporated applications and/or as is described in other utility locator patent applications or products, such as those provided by SeekTech or SeeScan, assignee of the instant application.

The marker ball transceiver device 130 is configured to send a pulsed RF signal or "ping" 133 to the marker balls 160, typically of short duty cycle so that transmissions do not overlap with reply or utility emission signal reception windows. In operation, the marker ball 160 receives the "ping," rings up in energy when tuned to the output frequency of the particular marker ball transceiver device 130, and then sends a return signal 135 as shown in FIG. 1B. The return signal, which may be detected by the marker ball transceiver 130, can then be used to provide information indicating the presence of a marker ball 160 and, in some implementations, data stored in the marker ball.

The marker ball return signal 135 is typically sent at the same frequency as the transmitted signal, thereby requiring pulsed or "pinged' transmit signaling from the transceiver device in order to work. Path losses in these circuits are typically on the order of the reciprocal the distance cubed, and further signal loss typically occurs in the marker ball circuitry when the received signal is scavenged, converted to a power signal, and an output signal is then generated. This is a problem when continuous operation is desirable and/or if it is desirable to receiver other signals or interest at the same or similar frequencies.

In a system such as that shown in FIG. 1A and FIG. 1B, an additional problem occurs when a separate transmitter device, such as the transmit subsystem of transceiver 130, is placed in proximity to a utility locator or integrated into a utility locator, such as locator 120. The locator 120 typically includes an antenna array along with high sensitivity circuitry to receive magnetic field signals over a wide dynamic range and wide frequency range (e.g., 10s of Hz to 500 kHz or more) to pick up weak signals at a wide range of frequencies from buried utilities. Typical receiving antenna coils used in utility locators are wideband and can likewise receive signals over a wide frequency range.

When the marker ball transceiver device 130 sends the transmit ping 133, the transmit signal may generate high output voltages in the locator 120 antenna coils and overload the locator's input circuitry, thereby making it difficult, if not impossible, to perform locate functions related to the much lower signal strength buried utility signals (e.g., signals 106 as shown) when transmit signals are sent from the marker ball transceiver device. Moreover, even if the two systems (locate and marker ball) were synchronized, such as through use of multiplexed receiver inputs, continuous operation of the locator 120 would not be possible since the input would have to be switched between marker ball 130 transmit operation and locator signal reception and processing functions. Therefore, in one aspect, it is desirable to provide an alternate system that allows for simultaneous transmit and receive operations in an integrated locator or in other systems employing and locator and/or marker device transceiver. In other aspects, similarly configured marker devices may be used with standalone marker device transceivers or receivers in various embodiments, and/or with marker device receivers or transceivers that are in communication with utility locators or integrated therewith in further embodiments.

EXAMPLE EMBODIMENTS

Figure 2A:
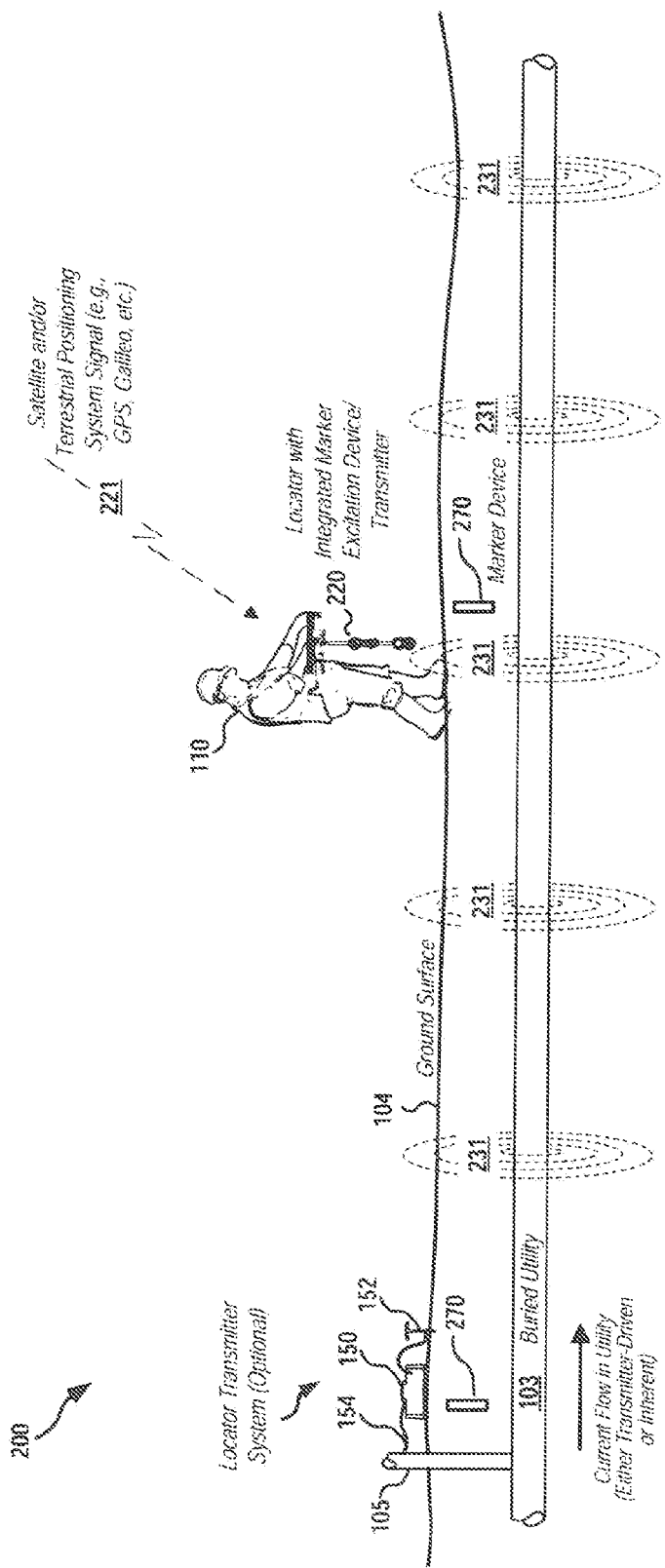
FIG. 2A illustrates details of an embodiment of a system including an integrated utility locator and marker excitation device/transmitter.

In accordance with certain aspects, a marker device system embodiment 200A is shown in FIG. 2A. In this system, a locator 220, having an integrated marker device excitation/transmitter subsystem (also denoted herein as an "integrated locator" for brevity) may be used to detect marker devices 270, which may be buried below the ground or otherwise on or within other objects or structures, as well as perform standard locate operations. Such a locator may be configured in the same or similar way to that of locator 130 but with the addition of the integrated locator functionality illustrated and described with respect to FIG. 2A and subsequent drawing figures. In operation, locator 220 sends excitation signals from the excitation/transmitter subsystem either continuously (in a typical embodiment) or at least partially during a receive time window where the locator is receiving reply signals from a marker device, utility signal emissions (active or passive) or both.

In typical embodiments, these operations may be done simultaneously as described subsequently herein, for example by continuously providing an excitation signal, which may be a continuous wave (CW) signal or may be modulated to include data or other time-varying signaling characteristics. For example, an integrated locator embodiment including aspects of a traditional locator circuit along with additional aspects, as described subsequently herein related to marker device operation, may be used by an operator 110 to perform both locate operations and marker device operations simultaneously and combine and store the results for display, retransmission, downloading and/or other post-processing operations or related functions.

The locator may be combined with a marker excitation device to implement an integrated locator/marker device or "integrated locator" that allows simultaneous utility locate operations and marker device locate operations (e.g., the marker device excitation does not significantly impair operation of the locator in sensing and processing buried utility magnetic field signals) and/or additional functions such as data combination, determination of position location, such as through the use of satellite or terrestrial navigation systems such as GPS and the like, mapping of both locate information and marker device information, geographical mapping and coordinate generation, capturing images or video, which may be combined with the locate and marker device location information, and the like. Prior art systems that provide excitation ("transmit") and receive functionality typically include a transmit/receiver (T/R) switch to allow an operator to switch from transmit mode to receive mode, reflecting the fact that these two operations are not done simultaneously. Since embodiments of integrated locators as described herein allow for simultaneous transmit and receive operation, in typical embodiments such a T/R switch is not needed and may be omitted.

Figure 2B:
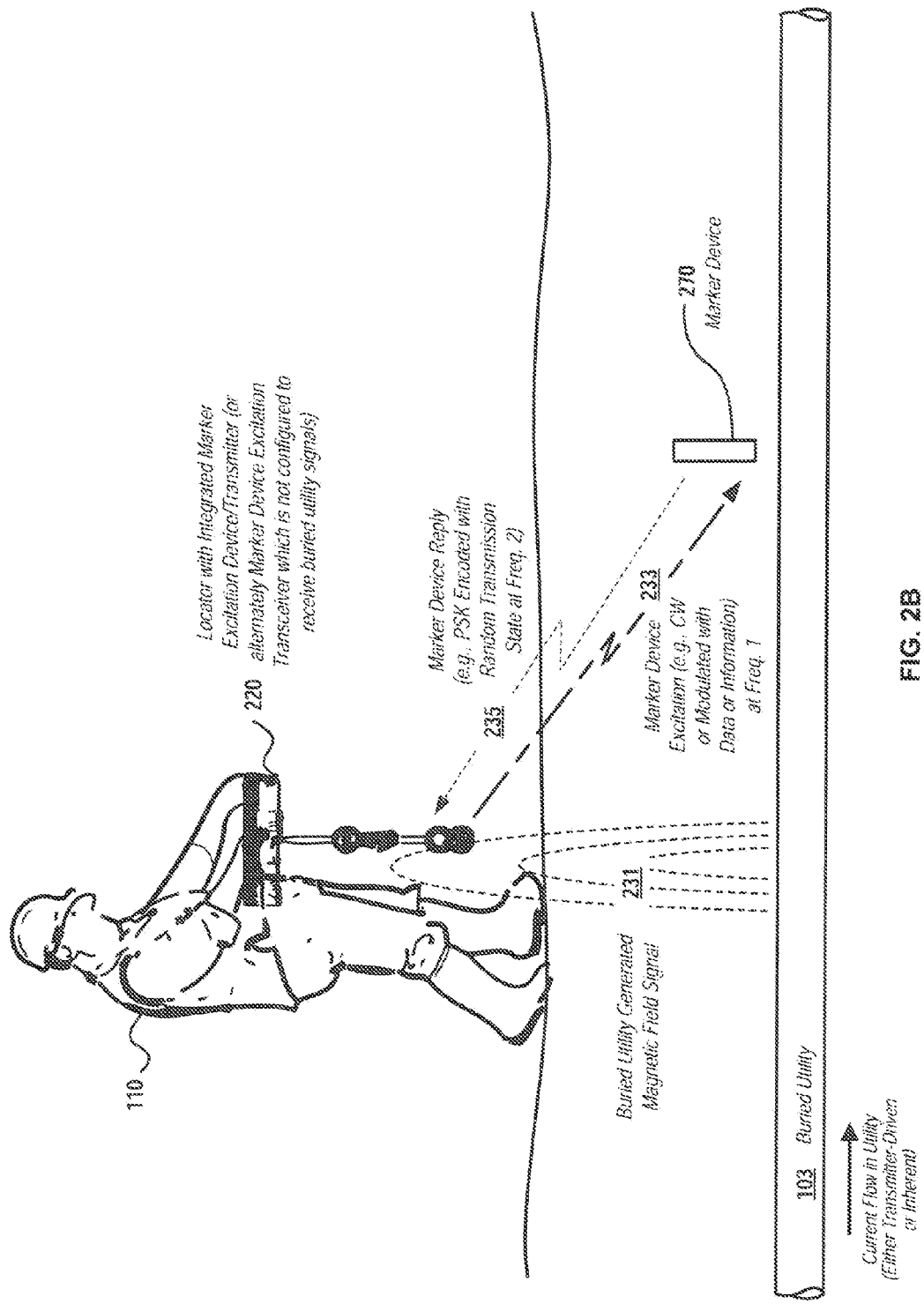
FIG. 2B illustrates additional details of the embodiment of FIG. 2A showing operation of the integrated utility locator to receive and process signals from a buried utility as well as ping a marker device and receive a corresponding reply from the marker device, which may include serial numbers or other data or information.

In the system embodiment 200 of FIG. 2A, a utility transmitter device 150 may be used to couple current signals to buried utility 103 (e.g., a buried pipe or conduit) via a direct coupling 154 to a stub 105 coupled to the utility 103. A ground stake 152 may be used to couple the ground output of the transmitter to the ground 104 for return current flow. One or more marker devices 270 may be buried in or under the ground surface. For example, in the configuration shown two marker devices 270 are placed below the ground surface, for example at one or more feet below the ground surface. In operation, a user 110 traverses the ground surface 104 with integrated locator 220, which both senses magnetic field signals 231 emitted from the buried utility 103 due to flow of current therein as well as senses signals from marker devices 270 (as shown in FIG. 2B). In some embodiments, locator 220 further includes positioning system modules, such as a GPS receiver module (not shown) to receive satellite or terrestrial positioning system signals 221 to determine local position information, such as latitude/longitude coordinates, elevation, and the like and/or other modules such as cameras or imaging sensors (not shown), inertial navigation sensors (not shown) and the like.

Turning to FIG. 2B, additional details of the system 200 embodiment of FIG. 2A are illustrated. In a typical operational scenario, integrated locator/marker excitation device 220 includes marker excitation (transmit) functionality as described subsequently herein, along with utility locate (receive) functionality. Further, both functions may be used simultaneously (e.g., a user 110 may perform both utility locates and marker device location at the same time without the marker device excitation subsystem impairing operation of the locator), with the locator processing both types of signals rather than switching from one mode of operation to the other as in existing locators.

An example of such an operation is shown in FIG. 2B. Magnetic field signals 231 generated from current flowing in the buried utility 103, either inherent to the utility or coupled to the utility from a transmitter as shown in FIG. 2A (or other device or system), are sensed by one or more magnetic field antenna arrays in the locator 220. Magnetic fields may also be generated from the buried utility using a sonde device (not shown) or other magnetic field source (not shown). The transmitter and/or sonde device may be communicatively coupled to the locator 220 via, for example, wired or wireless communication links and corresponding communication modules in the locator, transmitter and/or sonde.

In addition, the integrated locator 220 may generate an excitation signal 233 via a marker device excitation/transmitter subsystem on or within the locator 220. Excitation signal 233 may be a continuous wave (CW) signal, or may be modulated with data or other information in some embodiments, at a predefined first frequency (frequency 1) or multiple frequencies. Although the excitation signal 233 is typically turned on all or most of the operational time period (and in particular during at least some overlapping time intervals when standard locator receive operations are being performed) in an exemplary embodiment, it may be pulsed or otherwise switched on or off or provided at different power levels in some embodiments to provide additional functionality, such as during portions of predefined time slots or during portions of a receive window to, for example, conserve battery power (e.g., through an operator switch, or when marker devices are not present or are not located within a certain time interval, etc.) or provide other functionality such as data communications or control signaling. It is noted that the excitation signal 233 is shown as being beamed or directed at the marker device 270 shown; however, the actual pattern will typically be at least somewhat omnidirectional so that marker devices 270 spread over a wider area on or in the ground may be detected. In a typical embodiment, the marker device 270 sends its reply signal at a second frequency (frequency 2) or frequencies that are different from the excitation frequency (e.g., frequency 1).

Figure 3:
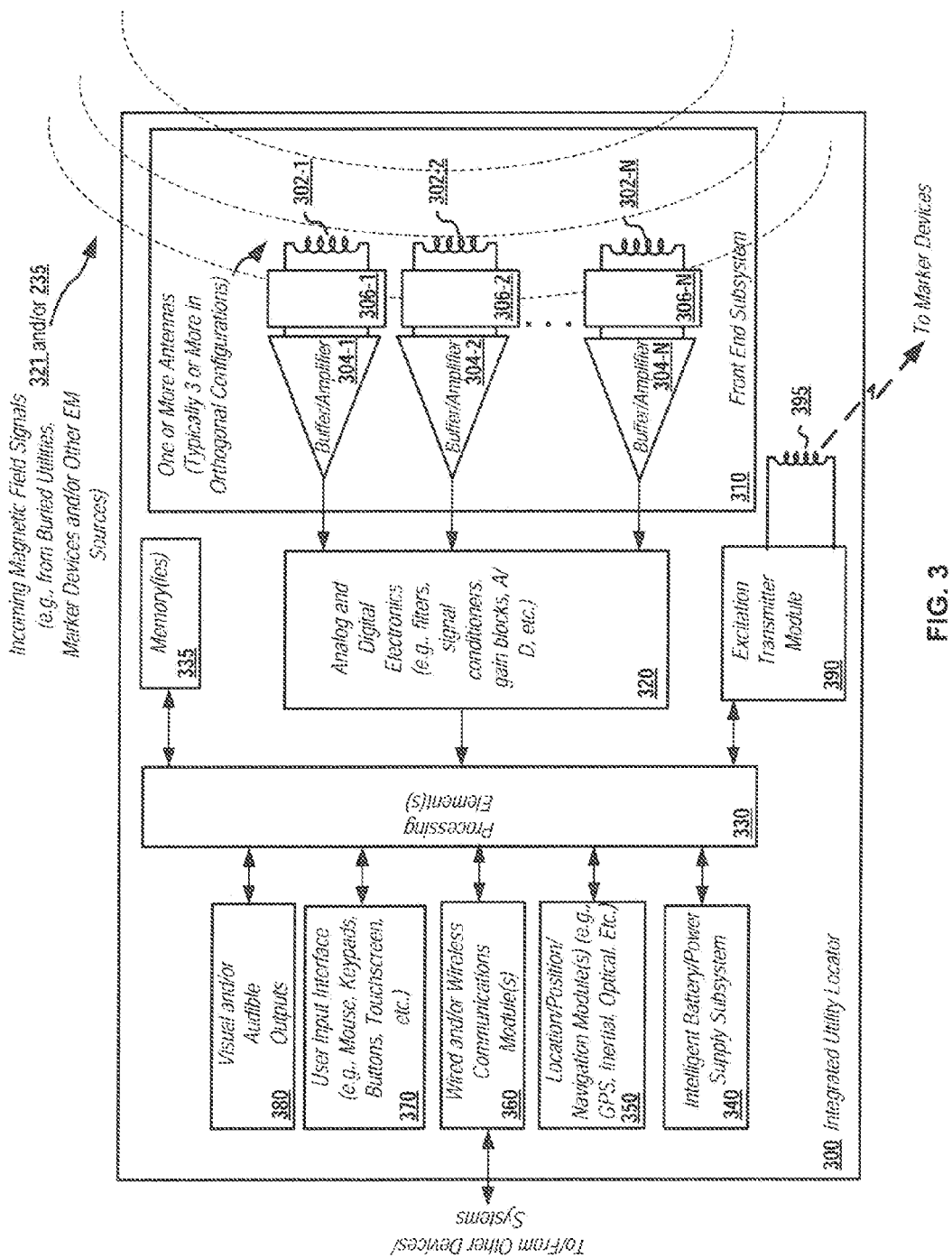
FIG. 3 illustrates certain details of an embodiment of a utility locator device configuration including a locator front end sub-system for receiving magnetic field signals from buried utilities and/or marker device and an excitation transmitter module integral with the locator.

In some embodiments an integrated locator device or system may include a location/position sensing module, such as a GPS, Galileo, GLONASS, or other satellite or terrestrial navigation/position sensing module. In embodiments with positioning system modules (e.g., a GPS receiver module) incorporated in or coupled to a locator, excitation power may be turned on in the integrated locator based on GPS or other position data, such as based on mapped marker device data stored in the locator or downloaded to the locator either before the locate operation or during the locate operation, to match the mapped marker device information to the received GPS coordinate data. For example, such a locator may have map data stored in memory that covers an area where a locate operation is being performed. An incorporated GPS module may generate coordinate data during the locate operation, and the presence of or suspected presence of marker devices, which may be based at least in part on the map data, may then be used to control excitation by turning the excitation transmitter module power on (when it is suspected that marker devices are present) or off (when it is suspected or known that they are not) or otherwise controlling output power. This power control operation may be implemented in one or more processing elements or modules of the locator, such as in processing element 330 as shown in FIG. 3, or in other elements of the locator.

Upon energization from excitation signal 233, marker device 270 may generate a reply signal 235. The locator 220 may then receive the marker device reply signal 235, which may be CW in some embodiments. However, in a typical embodiment, reply signal 235 includes data or other information or coding, such as serial numbers and/or device type identification numbers, other device type information, location/position information (upon initial placement), environmental condition data, associated utility type, chipping, and the like. In an exemplary embodiment, the signal 235 is phase-shift keying (PSK) modulated; however, other modulation schemes, such as FSK, ASK and the like may be used in alternate embodiments, and/or may be combined with PSK modulation in some embodiments.

The locator 220 may process the received magnetic field signals 231 along with the received marker device reply signals 235 and generate information associated with both the buried utility 103 and the marker device 270. This processing may be done simultaneously in one or more processing elements such as processing element 330 as shown in FIG. 3, or in other processing elements of the locator. The processed information may be displayed to the user, stored in one or more memories, combined or associated with additional information, such as location or position information and/or transmitted to other devices or systems. For example, in one embodiment, a display element (not shown) of locator 220 may show standard locate information associated with the buried utility (e.g., depth, direction/orientation, current, tilt, fuzziness/uncertainty of data, etc.) along with data, serial or device number, and/or other information from the marker device 270. As described subsequently, in various embodiments this functionality may be performed simultaneously, without the marker device excitation signal 233 or marker device reply signal 235 interfering significantly with locator operations in detecting and processing utility-generated signals 231.

In some embodiments, device 220 of FIG. 2B may alternately be configured as a marker device excitation transceiver, which may be configured to perform sending of excitation signals 233 and receiving of reply signals 235 but not include elements or modules to receive and/or process locator signals 231. This configuration may be used, for example, in applications where no utilities are present and the marker devices are used for other purposes, such as identifying ground positions, plot boundaries, presence of other underground objects aside from buried utilities, surveying reference points and the like.

FIG. 3 illustrates details of an example embodiment 300 of elements of an integrated locator device in accordance with certain aspects. Locator device 300 includes a front end subsystem 310 that may include one or more antennas 302 (typically two or more omnidirectional antenna arrays having antennas in three orthogonal dimensions, along with one or more pairs of gradient antenna coils). The antennas 302 are typically in the form of antenna coils having a wide bandwidth (e.g., from 10s of Hz to 500 kHz or more). Example antennas and associated locator elements and configurations that may be used are described in the incorporated applications. A circuit 306 may be coupled to the antenna to provide impedance matching and/or filtering functionality and/or other functionality as described herein. One or more buffer and/or amplifier stages 304 may be coupled to the antennas 302 and/or circuit 306 to further buffer, condition, and/or amplify the outputs of the antennas. There are typically dedicated circuits 304 and 306 for each antenna coil; however, other circuit configurations may be used in some embodiments.

Additional analog and/or digital circuit elements may be coupled to the front end subsystem 310 in module 320. For example, filters, signal conditioners, analog-to-digital (A/D) converters, multiplexers and the like may be included. The output of electronics module 320 may then be provided to one or more processing elements 330, which may be coupled to one or more memories 335. Memories 335 may be used to store instructions in a non-transitory format for implementing various functionality, as described herein, in the processing element(s) 335 by executing instructions on one or more processors or other programmable devices. Memories 335 may also be used for storing information associated with buried utilities and/or marker devices, for storing location or position information, and/or for storing other data, instructions, or information associated with operation of the locator and/or marker ball transmitter module 390.

Various additional modules may be coupled to processing element(s) 330 and/or memory 335. For example, visual and/or audible outputs 380, such as video displays, lights, speakers, headphone jacks, buzzers, touchscreens, etc. may be coupled to processing element(s) 330 and memory 335. User input interfaces, such as mice, trackballs, magnetic user interface devices (UIDs), buttons, touchscreen displays, etc. may be coupled to processing elements 330 to receive user input. One or more wired or wireless interface modules 360, such as Wi-Fi or Bluetooth transceiver modules, Ethernet or USB interfaces, cellular data interfaces, and/or other wired or wireless communication interface modules may be coupled to processing element(s) 330 and/or memories 335. One or more location or position modules 350, such as GPS or other satellite or terrestrial navigation receiver modules, one or more inertial navigation or location modules, such as accelerometers, compass or other magnetic sensors, etc., one or more optical tracking modules, and the like may be coupled to processing element 330 and/or memories 335.

Locator 300 may further include one or more intelligent batteries and associated intelligent battery interface modules in a battery/power supply subsystem 340 that may power processing element(s) 330, memories 335, circuit module 320, front end 320 elements, and/or other circuits or subsystem of the locator 300.

Locator 300 may further include, either internally or externally mounted or coupled to it, an excitation transmitter module 390. In various embodiments, excitation transmitter module 390 generates an excitation signal to be provided to one or more marker devices, such as marker devices 270 of FIG. 2A and FIG. 2B, and sends the excitation signal via one or more antennas 395. Although antenna 395 is typically located in proximity to front end subsystem 310 and associated antennas 302, which would, in an existing system, cause problems during simultaneous operation, as described subsequently, locator 300 provides reception and processing of magnetic field signals from buried utilities, as shown in FIG. 2B, while simultaneously transmitting marker device excitation signals from antenna 395 with substantial interference.

Figure 4:
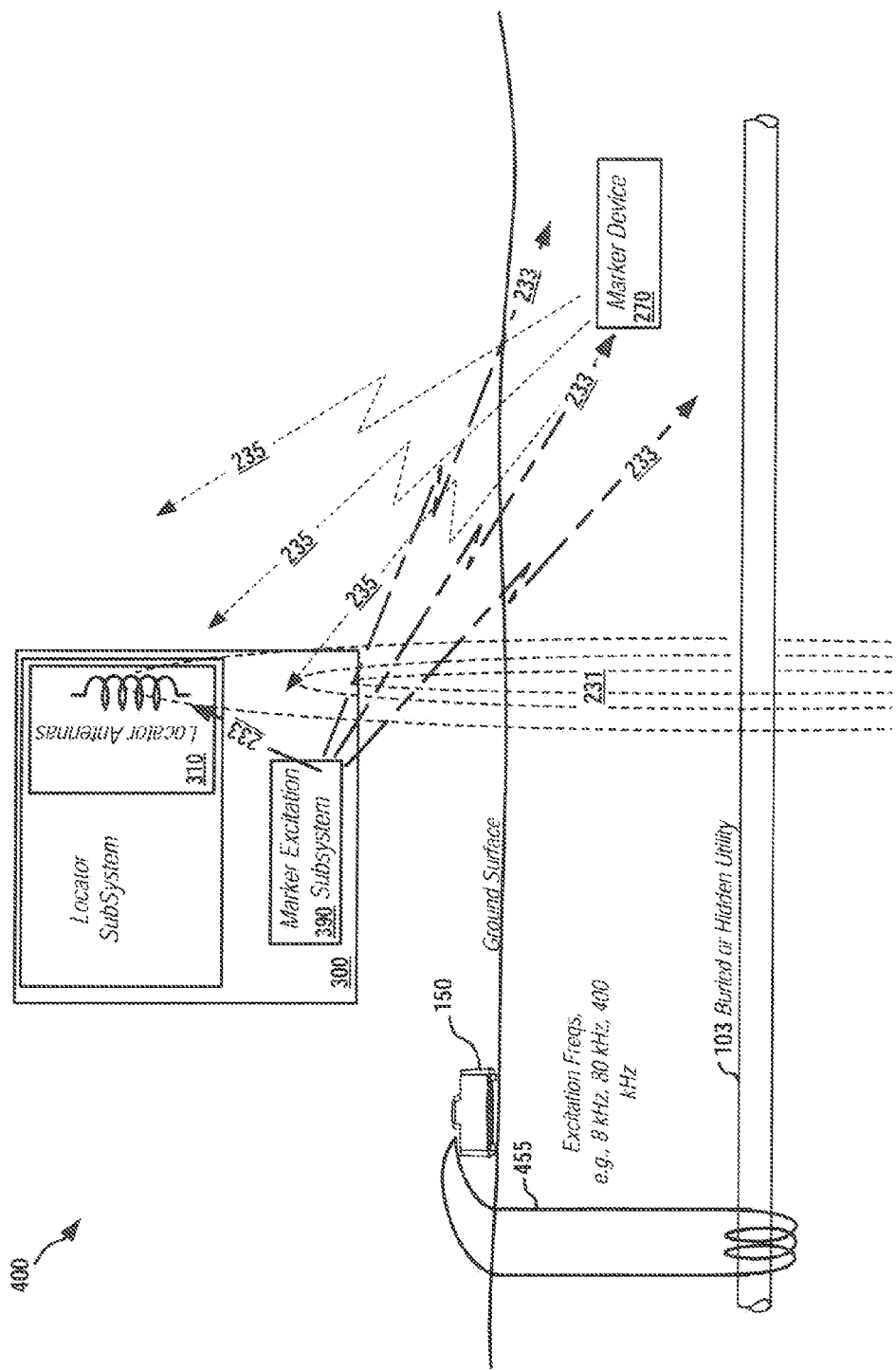
FIG. 4 illustrates simplified details of an embodiment of integrated locator and marker excitation subsystem signaling.

FIG. 4 illustrates additional details of the integrated locator embodiment 300 of FIG. 3, showing signals provided from and received by the locator 300 and a marker device 270. This illustrates the potential for interference between traditional locator functionality and the marker device excitation subsystem. As shown in FIG. 4, the marker excitation subsystem 390 (and associated antenna 395, not shown) generates and sends excitation signals 233 to be received by one or more marker devices 270 and scavenged for power. Some of the transmitted signal 233 energy may couple back into locator antennas of front end 310 as shown, and may then overload the antennas (e.g., create high voltages, on the order of 100 volts or more) and/or associated front end circuits such as buffers and amplifiers. This may saturate and/or damage the locator front end if the signals are strong enough. If the front end circuits 310 are saturated, the locator 300 may be unable to detect signals 231 from buried utility 103 and/or return signals 235 from marker device 270.

In order to address the previously described problems and/or provide higher circuit quality factors ("Q", or inductance, L, over resistance, R in series circuits) in various circuits to increase marker device system performance, example device configurations as described subsequently herein may be used in various embodiments.

Figure 5:
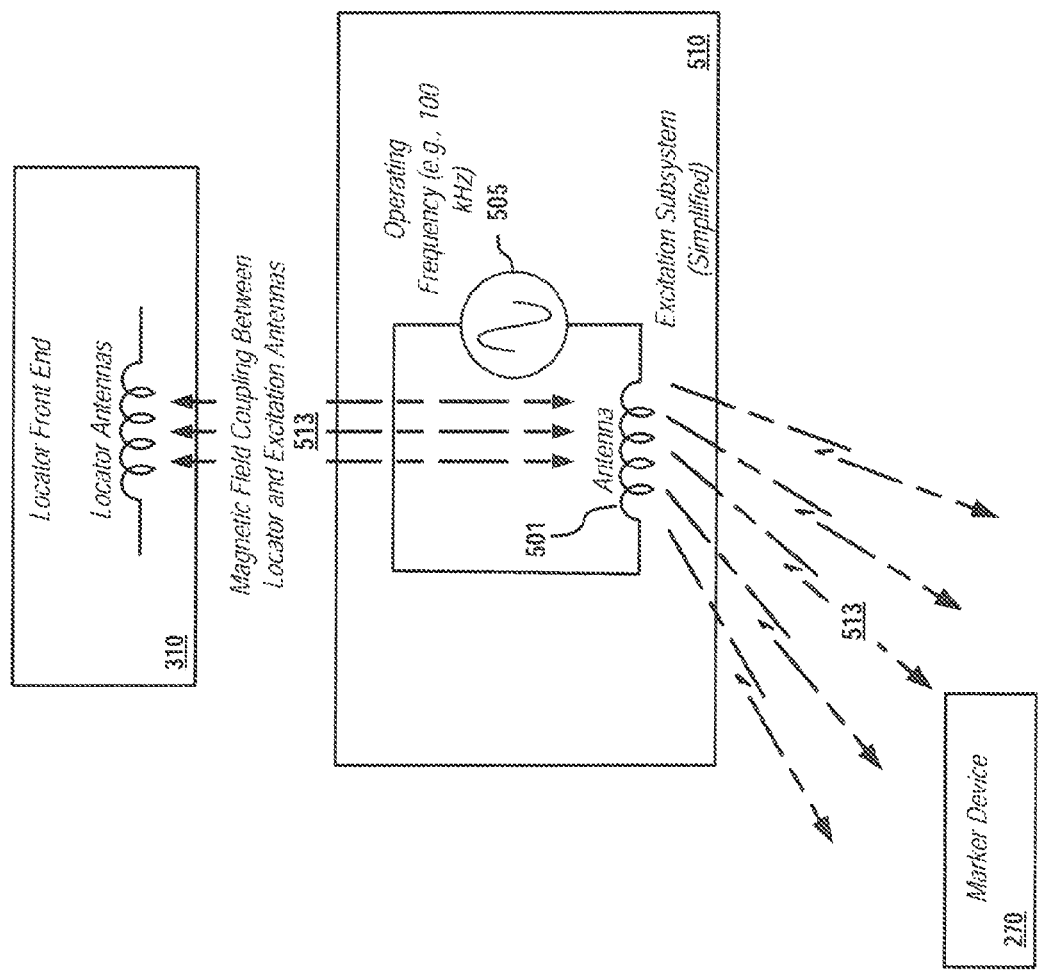
FIG. 5 illustrates simplified details of an embodiment of a basic marker excitation subsystem sending an excitation signal to a marker device.

FIG. 5 shows details of a simplified example of an excitation subsystem 510 that may be used in some embodiments. Excitation subsystem 510 may correspond with excitation subsystem 390 of FIG. 3, with antenna 501 corresponding with antenna 395 of FIG. 3. Whether the excitation subsystem 510 is integral with or in proximity to the locator front end 310, there will be some degree of magnetic field coupling between the locator antennas in front end 310 and the excitation subsystem antenna 501. When an output signal oscillator circuit 505 drives antenna 501, magnetic field signals 513 are generated and provided to marker device 270 as well as, to at least some degree, locator antennas in locator front end 310. The magnetic field signals 513 may be scavenged, as described subsequently herein, in the marker device 270 to power the marker device 270 to generate a reply signal, which may be a CW signal or may include data modulated on it.

Figure 6:
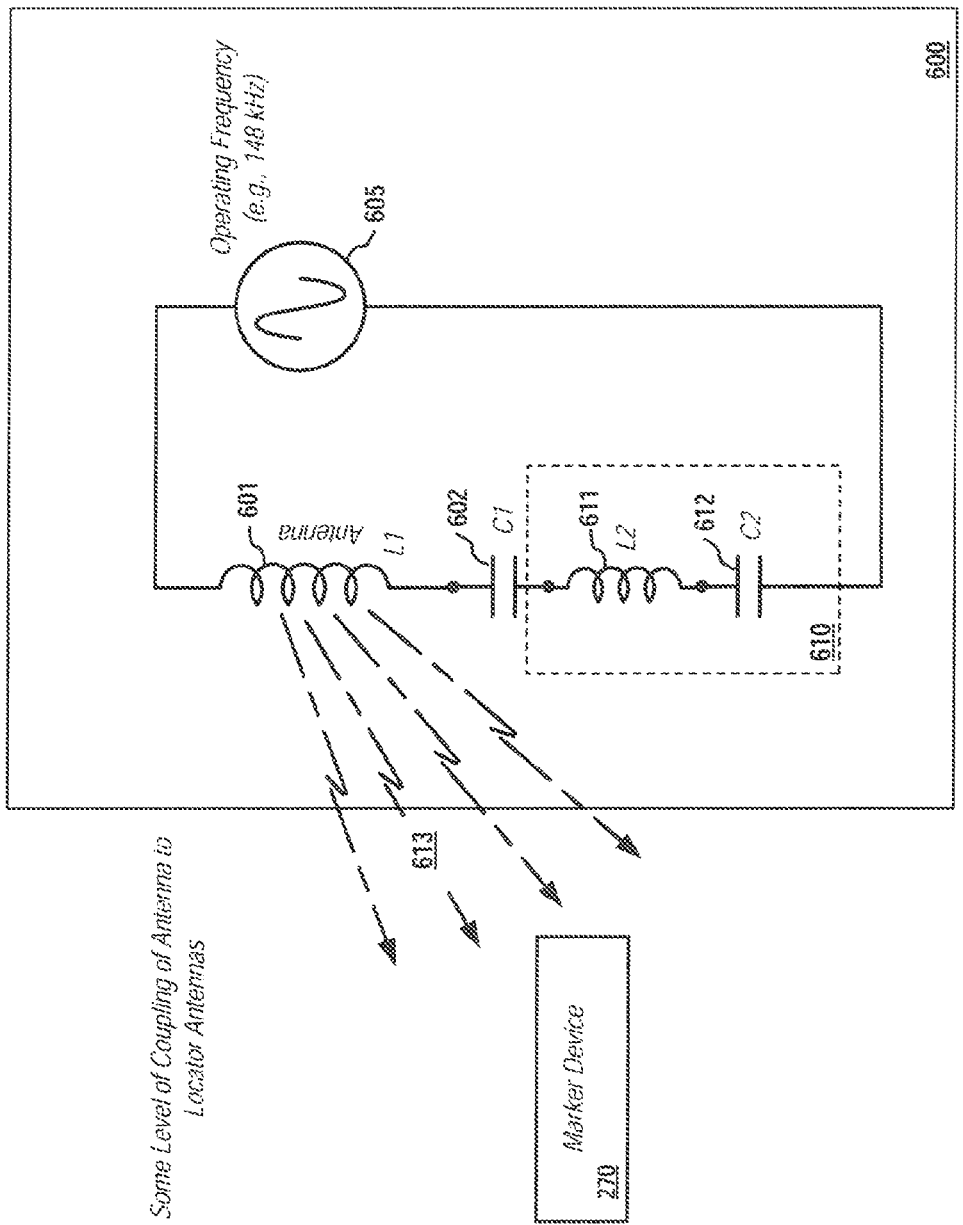
FIG. 6 illustrates simplified details of an embodiment of an enhanced marker excitation subsystem configured to increase Q (also referred to as Q factor or quality factor)

FIG. 6 illustrates details of another marker transmitter/excitation subsystem embodiment 600. In this configuration, the transmit antenna 601 may be modeled as an inductor, L1, with an associated tuning capacitor 602, labeled C2. By adding a second tuned circuit 610, which may comprise a second inductor 611, labeled L2, and a second capacitor 612, labeled C2, where L2 has an inductance that is higher than (e.g., by approximately an order or magnitude or more than L1) the Q of the circuit may be improved, which will consequently increase the current flowing in the circuit and increase the corresponding output magnetic field signal 613 provided to marker device 270.

Figure 7:
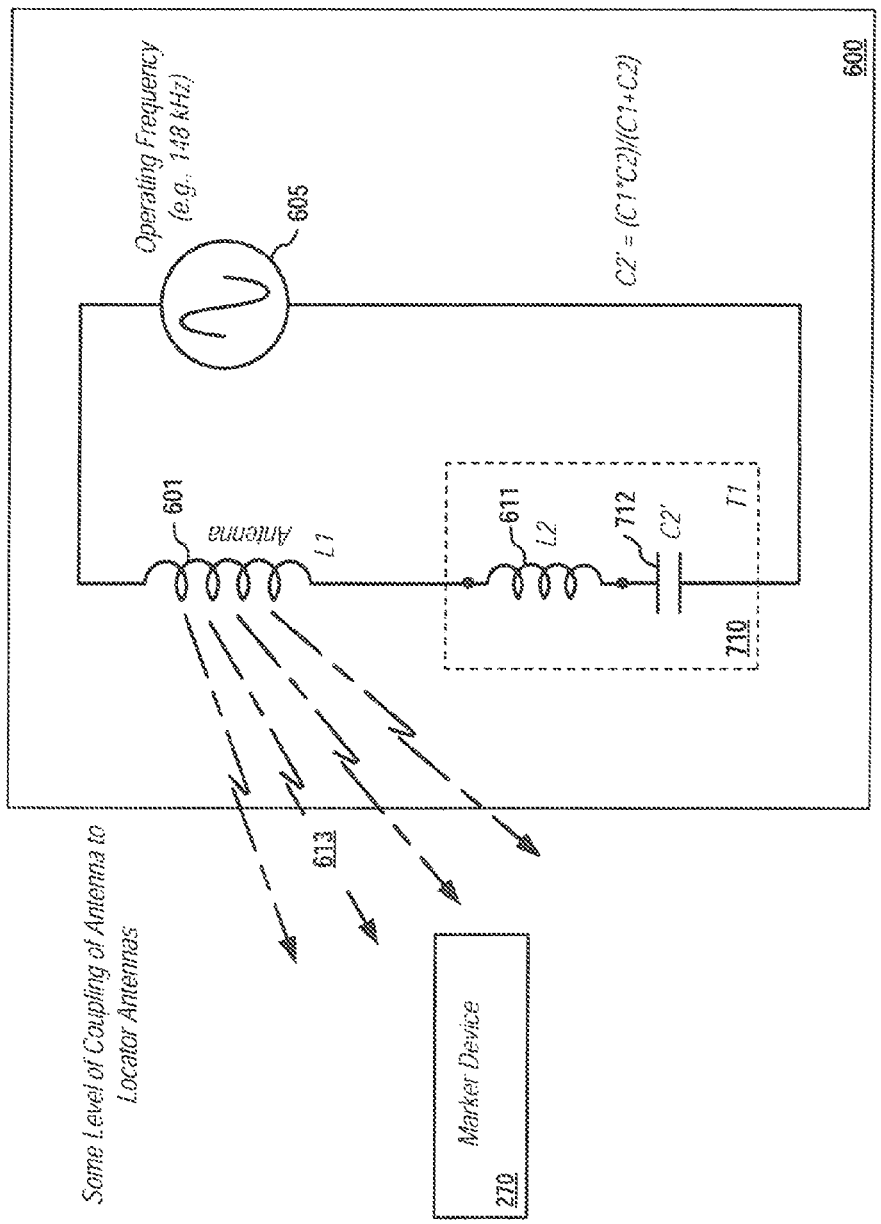
FIG. 7 illustrates details of the embodiment of FIG. 6.
Figure 8:
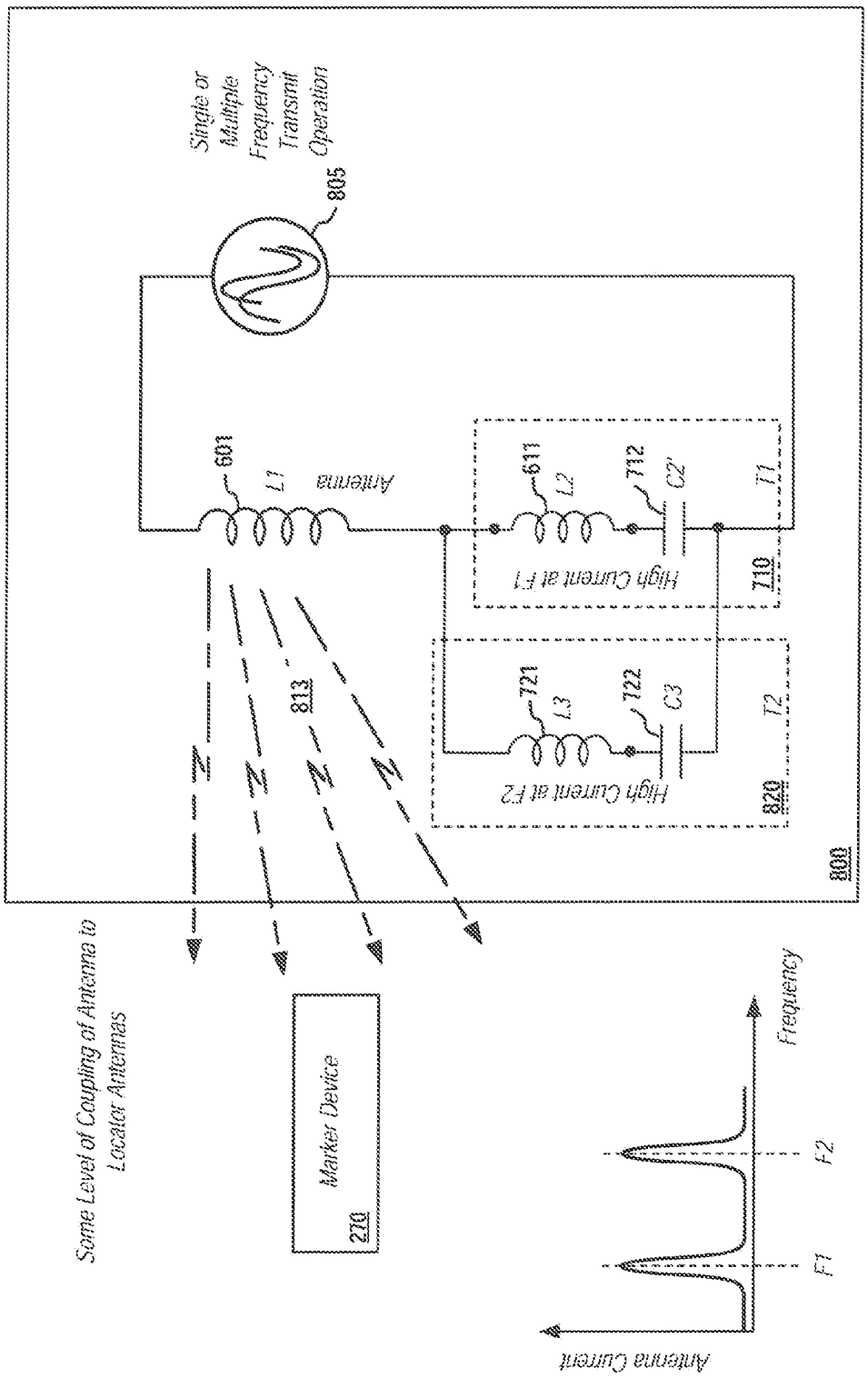
FIG. 8 illustrates details of another embodiment of an enhanced marker excitation subsystem configured to increase Q.

The components of the marker transmitter/excitation subsystem embodiment 600 may be combined, as shown in FIG. 7, by adding capacitances C1 and C2 in series, resulting in a single capacitance C2' as shown, which may be viewed in combination with L2 as tank circuit 710, labeled T1. This circuit may then be modified, as shown in FIG. 8, to an alternate embodiment excitation circuit 800 by adding a second tank circuit T2. This circuit may be used to provide a double-tuning characteristic such that the antenna L1 and associated circuitry is resonant at two frequencies, F1 and F2 as shown, which may be used to transmit at multiple output frequencies. In particular, high current may flow in tank T2 and antenna L1 at F2, and high current may also flow through antenna L1 via tank circuit T1 at frequency F1, which may both be driven by a multi-frequency output signal oscillator circuit 805. The circuit elements L2, C2', L3, and C3 in tank circuits T1 and T2 may be tuned to various desired operating frequencies by selecting appropriate component values, which may, for example, be done using a SPICE model or other circuit modeling software, or by bench prototyping, etc.

Figure 9:
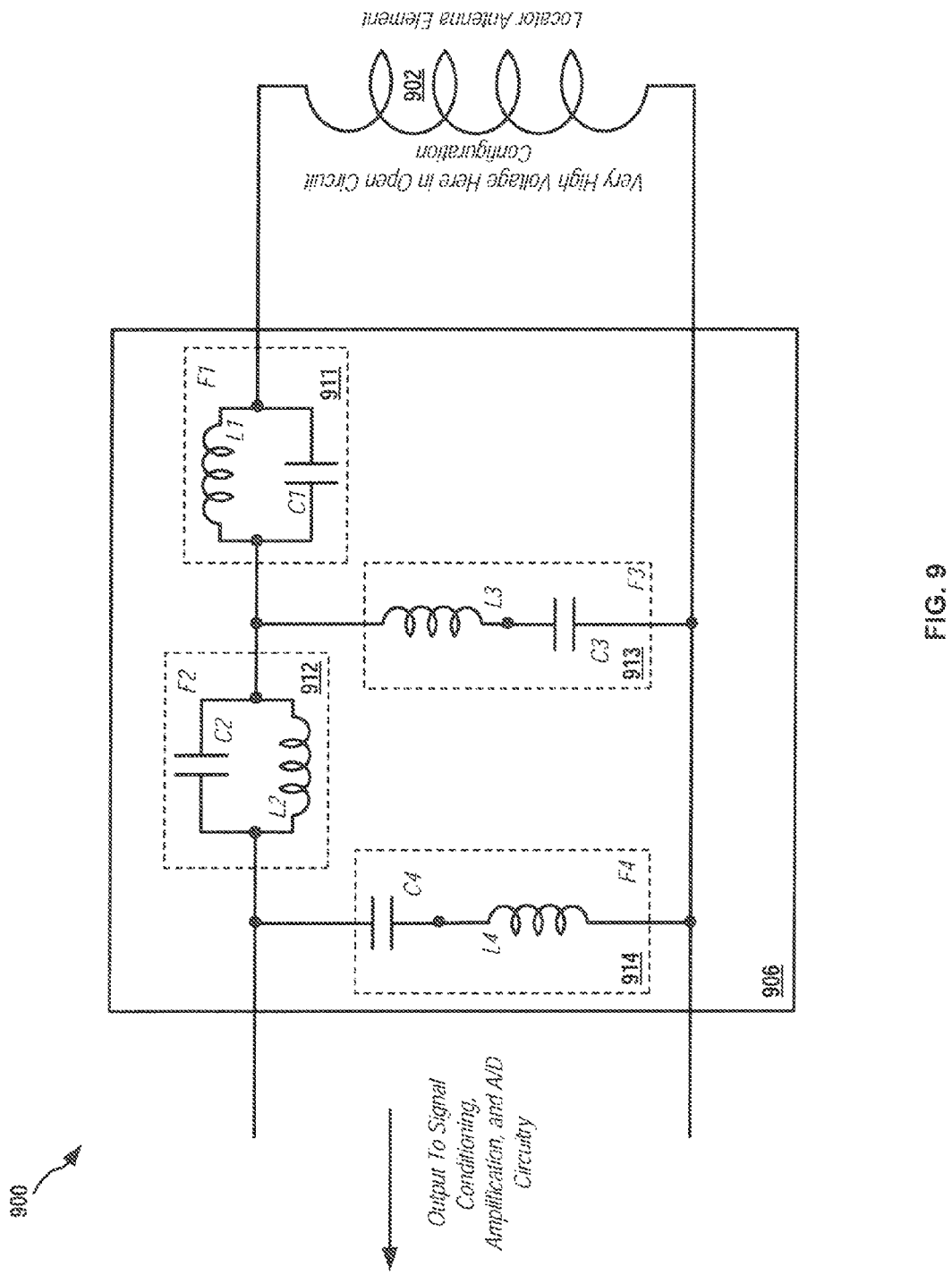
FIG. 9 illustrates details of an embodiment of an integrated locator front end circuit configuration.

In order to address attenuation of the excitation signal in the locator input circuitry, various additional aspects may be used in various embodiments. Intuitively, attenuation of received signals at the locator antennas at undesired frequencies (e.g., at the excitation frequency of the marker device excitation subsystem output) would facilitate reception of buried utility signals at the locator inputs. This intuitive approach, however, is problematic. For example, as illustrated in FIG. 9, a series of filters 911, 912, 913 and 914 may be used in circuit module 906, which may correspond with input circuit module 306 of FIG. 3. This configuration will attenuate signals at a tuned frequency; however, it presents an open circuit at the output of the antenna coil 902 (which may correspond with antenna 302 of FIG. 3). As such, high voltages, potentially on the order of 100 volts or more, may be present at the antenna coil outputs when signals at the excitation frequency are sent by the excitation transmit subsystem, such as subsystems 600 or 700.

Figure 10:
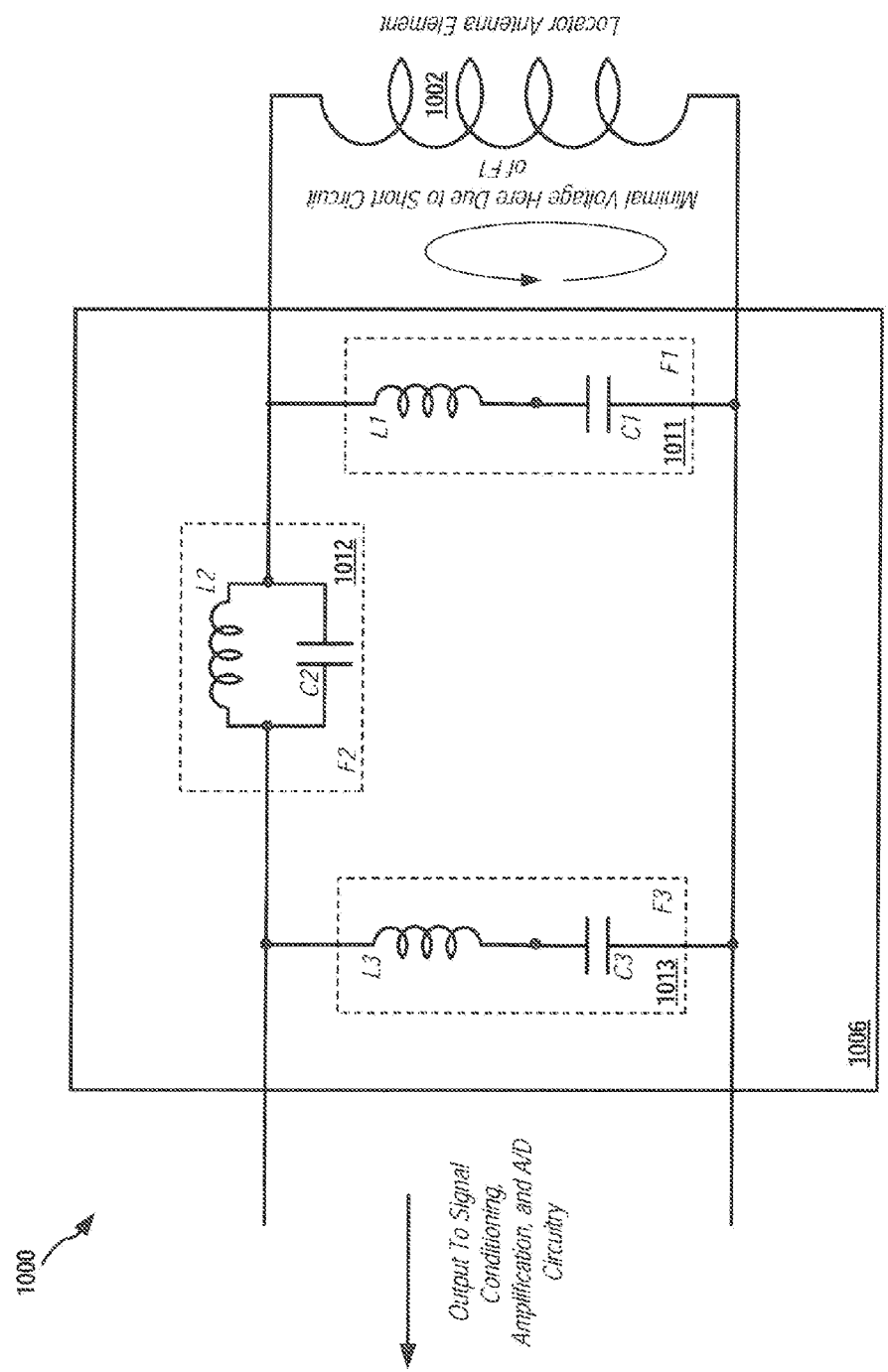
FIG. 10 illustrates details of an embodiment of an enhanced integrated locator front end circuit configuration.

An alternate approach, providing potential advantages over the open circuit configuration of FIG. 9, is shown in the circuit embodiment 1006 of FIG. 10, which may correspond with circuit module 306 of FIG. 3. In this configuration, circuits 1011, 1012 and 1013 (or other similar or equivalent cascaded circuit configurations) may be used and tuned such that they present a substantially short circuit at the excitation frequency and a standard input impedance at desired locator frequencies (e.g., marker device reply frequencies and/or buried utility output signal frequencies). By tuning circuits F1, F2 and F3 to present a short circuit at the marker device excitation output frequency (e.g., from circuits 600 or 800) current flows as shown from locator antenna 1002 (which may correspond with antenna 302 of FIG. 3) in a loop, resulting in minimal output voltage at the excitation frequency.

Figure 11A:
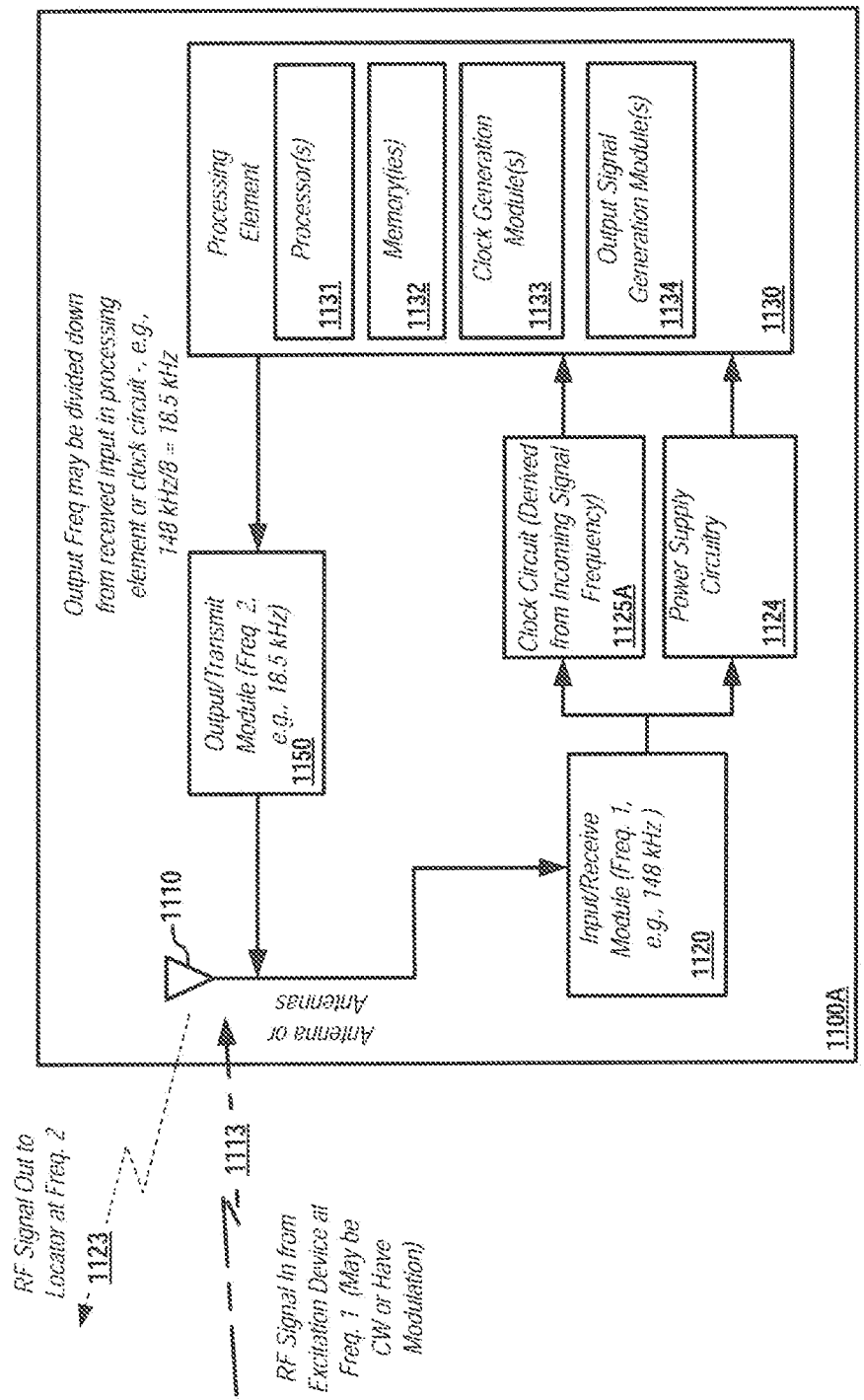
FIGS. 11A-11C illustrate details of embodiments of marker devices.
Figure 11B:
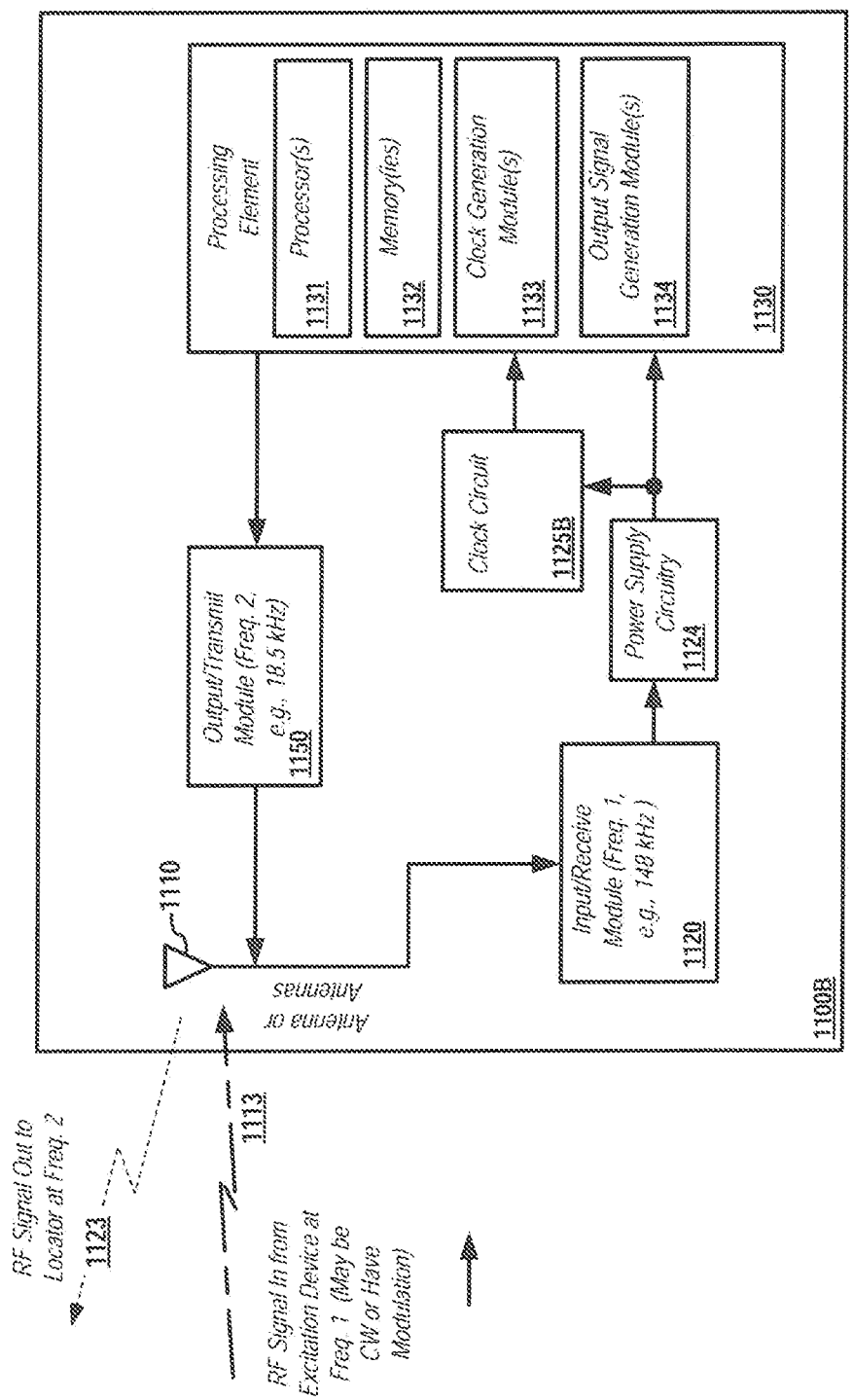
Figure 11C:
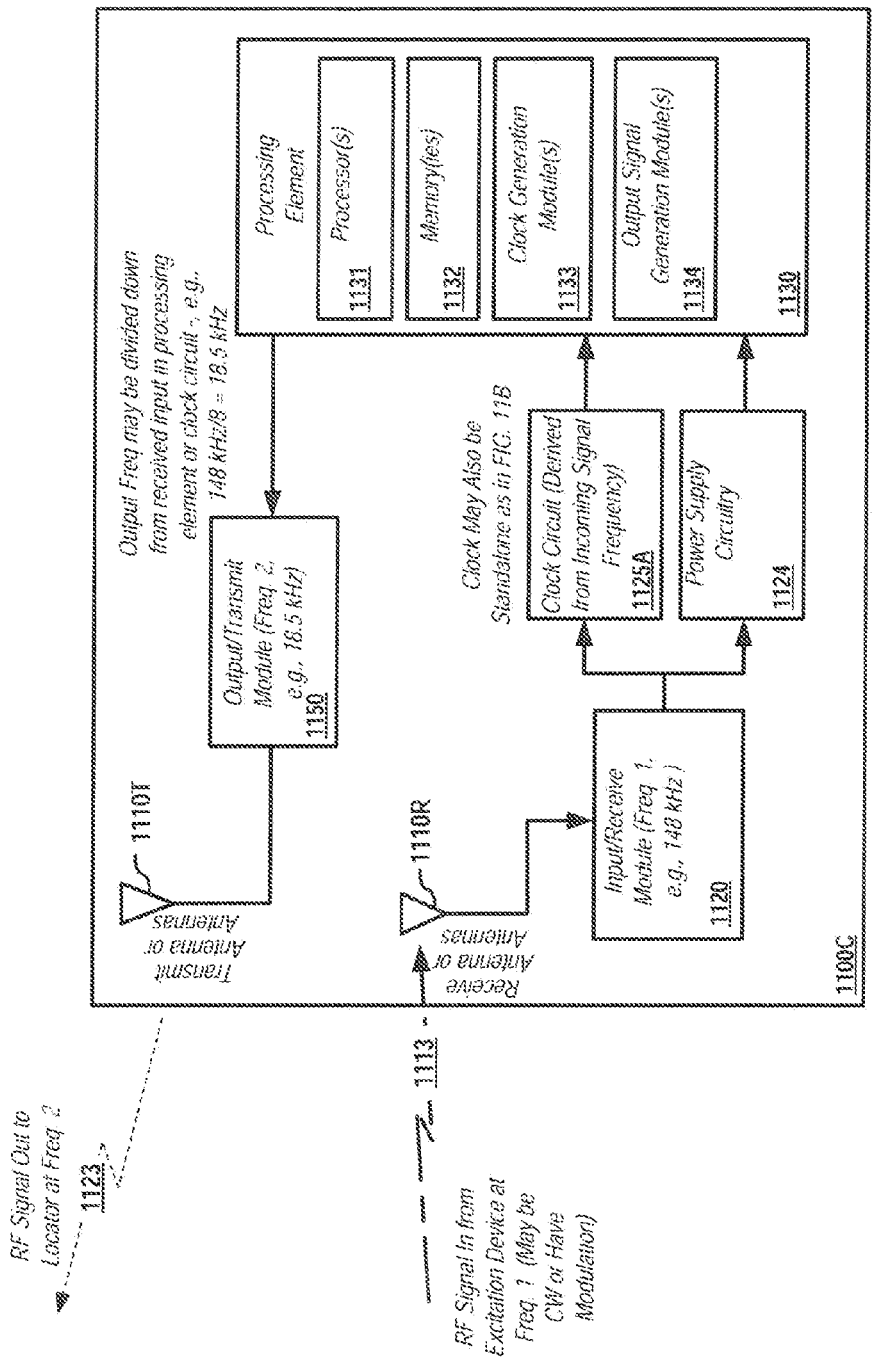

FIGS. 11A-11C illustrate details of example embodiments of marker devices in accordance with various aspects. These may correspond with the marker devices 270 as described previously herein or other marker devices, and may be configured and tuned to operate with integrated locators and corresponding excitation and locator front end circuits as described previously herein.

FIG. 11A illustrates an embodiment of a marker device 1100A having a clock circuit 1125A, which may be used to drive internal elements such as a processing element 1130, at a frequency synchronized with a corresponding excitation device output frequency. As shown in FIG. 11A, an input excitation signal 1113, which may correspond with signals 613 or 813 as described previously herein, is received at the marker device 1100A at a first frequency or frequency 1 (F1). An antenna or antennas 1110 may be used as both a transmit and receive antenna in the marker device. An input/receive module 1120 may be tuned to F1 and may generate an output signal that may be provided to a clock circuit 1125A and a power supply circuit 1124 (which may, in some embodiments, be integral with each other and/or with the receive module 1120). A clock output signal may be provided from the clock circuit to various other circuits such as, for example, a processing element 1130 which may be a microcontroller or other processor or programmable device. Power may be provided as an output from power supply circuit 1124 to the processing element 1130 and/or other circuit elements of the marker device (not shown).

The processing element may include various components such as, for example, one or more processing cores 1131, one or more memories 1132, which may store code or instructions and/or data or other information such as serial numbers, etc., a clock module or modules 1133 to generate clock signals (e.g., by dividing down or buffering input clocks, etc.), as well as one or more output signal generation modules 1134 for generating output signals. The output signal generation module(s) 1134 may include code and/or data to implement signal processing to generate output signals from the processing element, such as modulated data and/or other information signals or CW signals, to be provided to an output/transmit circuit module 1150.

Output module 1150 may be tuned to generate an output or reply signal from the marker device 1100A at a second frequency or F2, which is typically different than F1. The output signal may include data modulated using code in output signal generation module 1134, such as code to generate a phase shift keyed (PSK) or other modulated signal, such as an on/off (ASK) signal. The output frequency may be advantageously generated by dividing down the received input frequency signal to synchronize the output to the input in a frequency divider module or processing element. For example, the received input signal may be divided down by some predefined value, such as divide by 8, to generate the output signal. If the input signal is at, for example, 148 kHz, the output signal would then be 18.5 kHz. Other frequencies and divide ratios may be used in various embodiments. For example, F1 may be various integer multiples of F2 in different embodiments. The division may be done in the clock circuit and/or the processing element or other marker device elements (not shown).

FIG. 11B illustrates another embodiment of a marker device 1100B. This embodiment may be implemented similarly to the embodiment of FIG. 11A, but with an internal clock circuit that generates a reference clock signal that is not tied to the received signal frequency as in the embodiment of FIG. 11A. Clock circuit 1125B may be based on an LC circuit or crystal oscillator or other clock circuit.

FIG. 11C illustrates yet another embodiment of a marker device 1100C. This embodiment may be implemented similarly to the embodiment of FIG. 11A, but with separate transmit and receive antennas 1110T and 1110R. The clock circuit may likewise be tied to the received signal frequency as in the embodiment of FIG. 11A (e.g., as circuit 1125A as shown) or may be configured similarly to the circuit of FIG. 11B with a standalone clock circuit not tied to the received signal frequency.

Figure 12A:
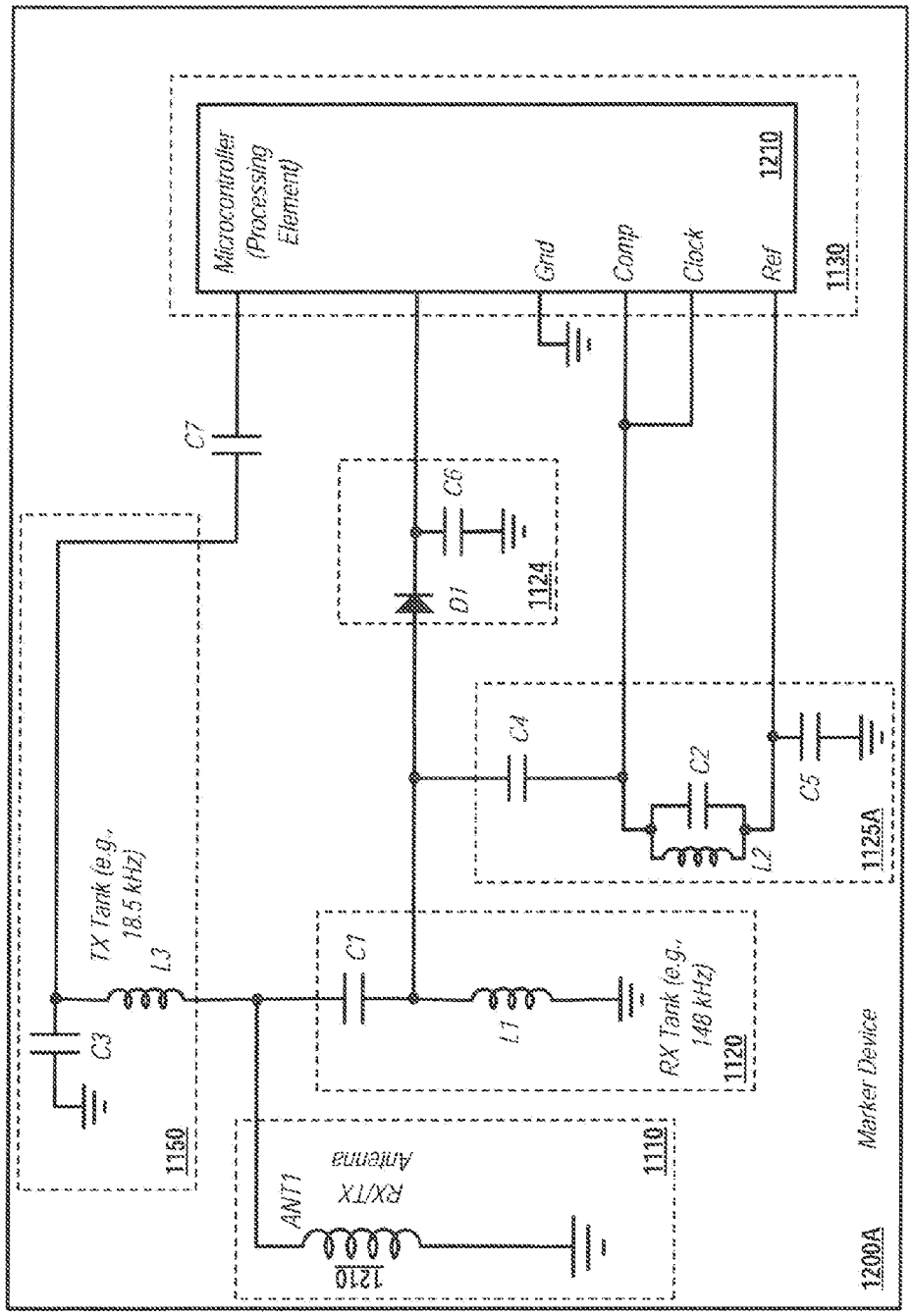
FIGS. 12A-12C illustrate additional details of embodiments of marker devices.
Figure 12B:
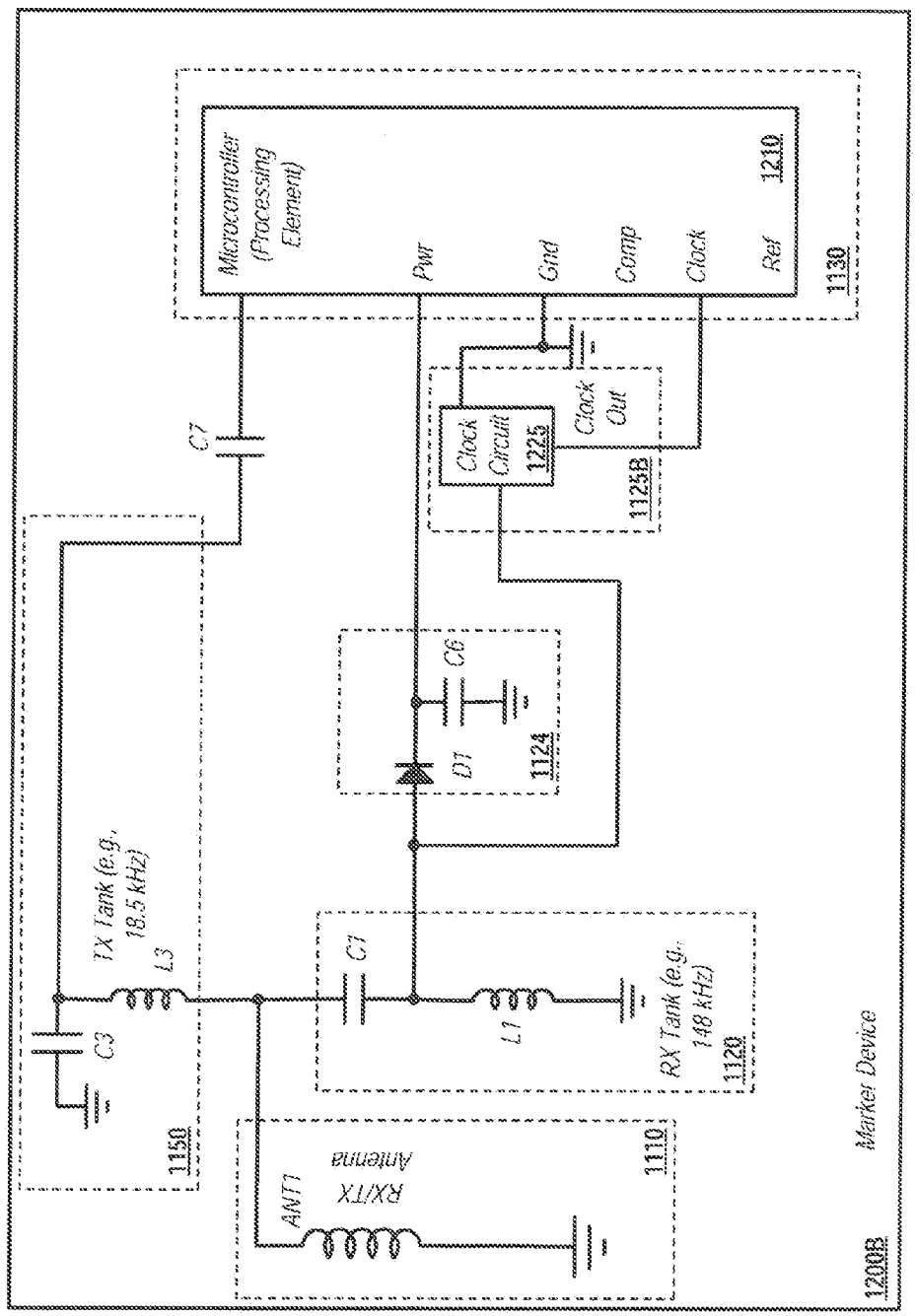
Figure 12C:
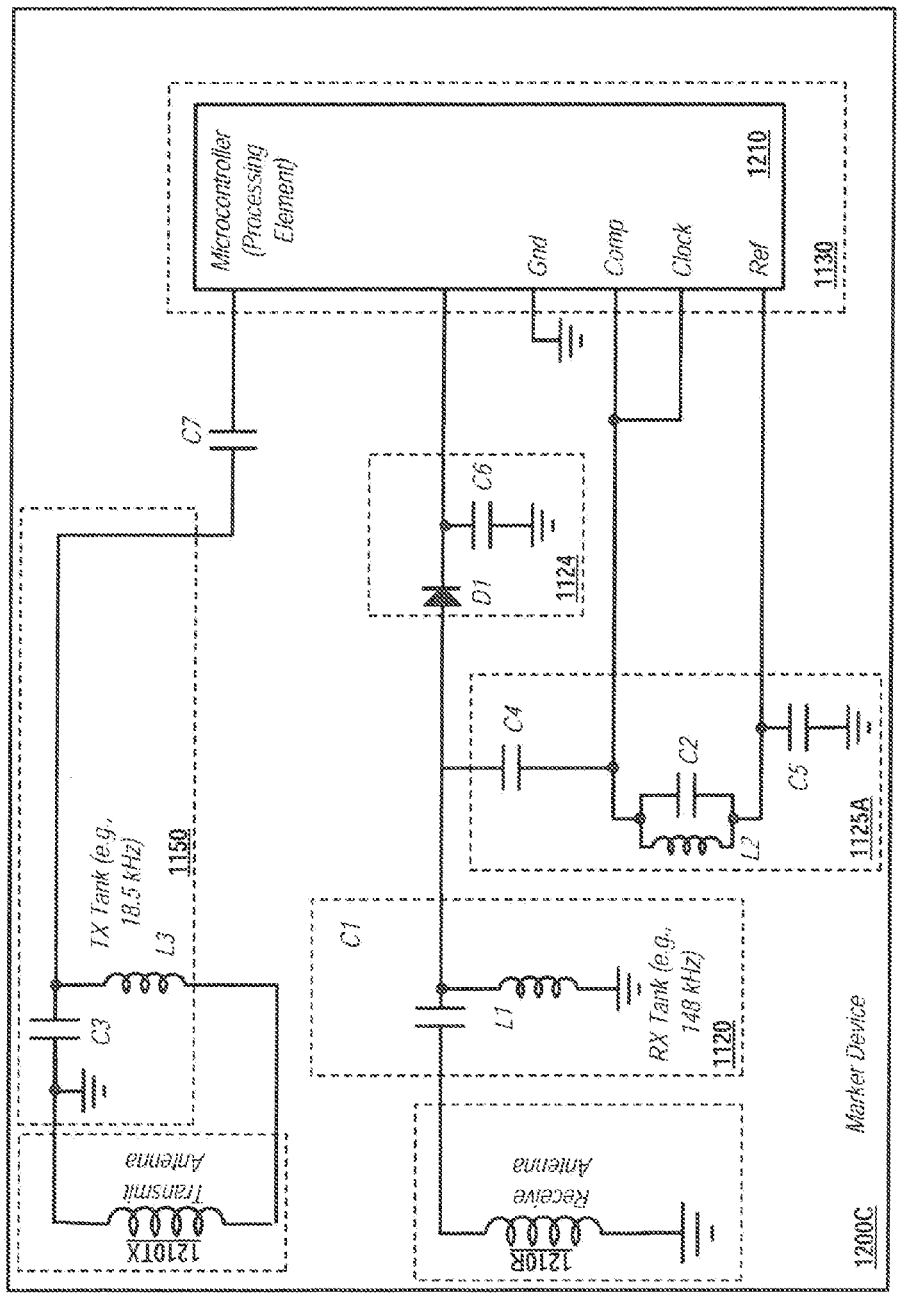

FIG. 12A, FIG. 12B and FIG. 12C illustrate details of embodiments of certain particular circuit elements as may be used to implement marker devices as shown in corresponding FIG. 11A, FIG. 11B and FIG. 11C. For example, as shown in embodiment 1200A of FIG. 12A, antenna 1110 may be implemented in an RX/TX antenna coil 1210, the receiver module 1120 may be implemented in a circuit comprising L1 and C1, the clock circuit 1125 may be implemented with the illustrated circuit comprising C2, C4, C5 and L2, the processing element may be implemented with a microcontroller 1210 such as, for example, a Microchip PIC device or other low power microcontroller. The power supply element 1124 may be implemented with a diode D1 and filter capacitor C6, and the output circuit may be implemented with a transmit tank circuit comprising C3 and L3 coupled to antenna 1210.

The division ratio C7/C3 may be selected to optimize the reply signal transmit power from the marker device so that its power is received at the locator near threshold when the power used to power up the device is at threshold. If the transmit power is set to be too strong, then the useful range may suffer in attempting to power the transmitter. If the transmit power is set to be too weak, then the reply signal from the marker device, although powered, cannot be adequately received at the locator (i.e., the reply signal cannot be heard or detected).

FIG. 12B and FIG. 12C illustrate similar circuit embodiments 1200B and 1200C corresponding to FIGS. 11B and 11C. In embodiment 1200B a clock circuit 1225, such as, for example, an LC or crystal-oscillator based circuit may be used. In Embodiment 1200C of FIG. 12C, separate input 1210R and output 1210T antennas may be used.

Figure 13:
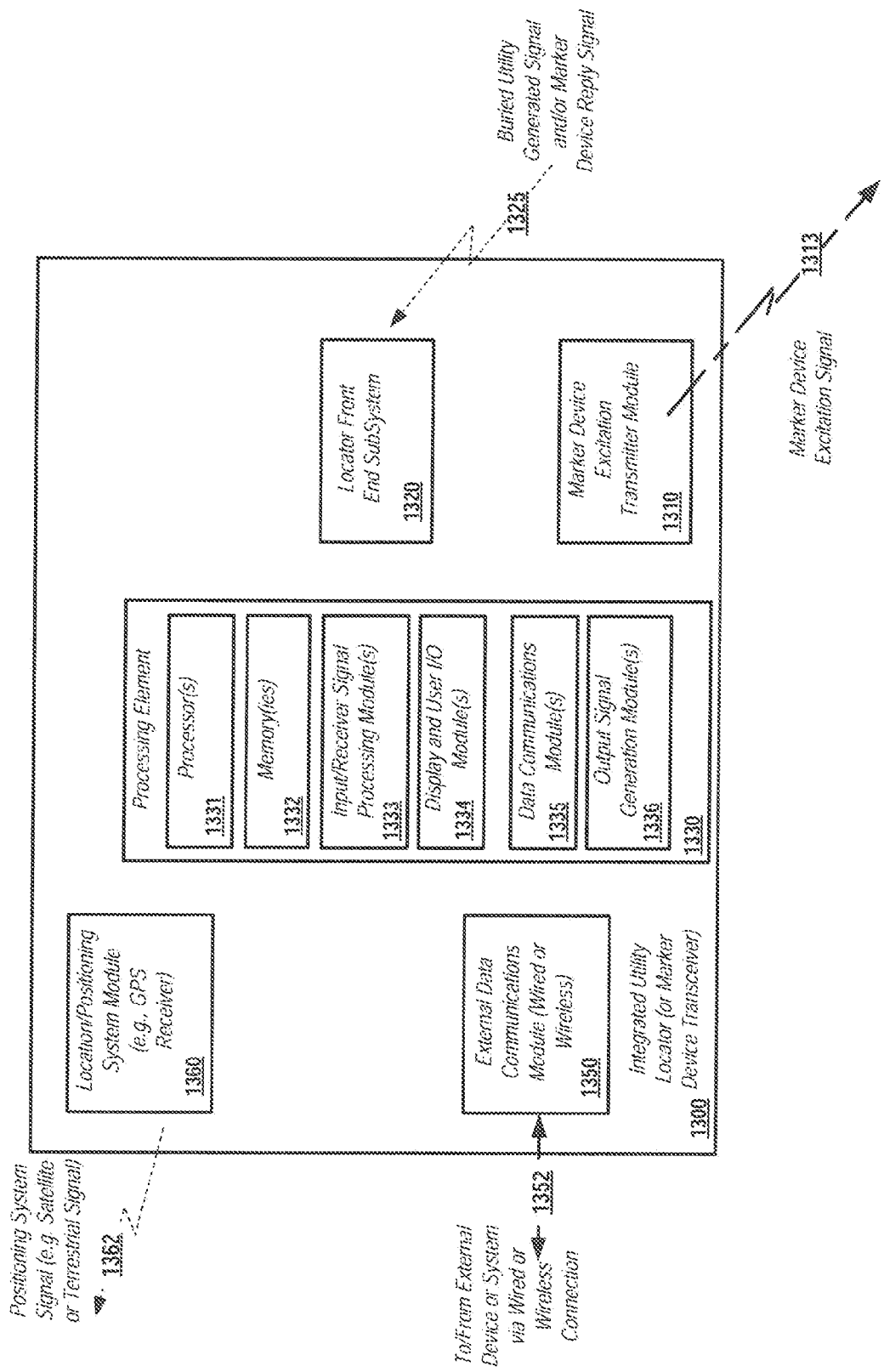
FIG. 13 illustrates details of one embodiment of an integrated utility locator system.

FIG. 13 illustrates certain details of an embodiment 1300 of an integrated buried utility locator system. Although the system shown in FIG. 13 is illustrated in the context of an embodiment of an integrated locator, it is noted that, in alternate embodiments, a similar configuration may be used to implement embodiments of a marker device excitation transceiver.

System 1300 may include, for example, a marker device excitation transmitter module 1310, which may generate and send a marker device excitation signal 1313 at a marker device excitation signal frequency. As described previously herein, excitation signal 1313 is typically generated and sent in a continuous fashion and will overlap in time with signal 1325. However, in some embodiments, signal 1313 may be turned off during a portion of the receive signal window for signal 1325 and/or during other time periods, such as to save power in the device 1300 (which will typically be battery powered).

The system 1300 may further include a front end subsystem 1320. The front end subsystem may be configured to receive signals 1325, such as a signal from a buried utility, and/or a reply signal from a marker device responsive to the marker device excitation signal. The system 1300 may further include one or more processing elements 1330. The processing element(s) may be programmed to process the received buried utility signals and/or marker device signals and generate information associated with the buried utility and the marker device based at least in part on the received buried utility signal and/or marker device reply signal. Instructions for performing this function may be stored in a non-transitory memory or memories of the processing element that may be coupled to a special purpose or general purpose processor or other programmable device.

The processing element may include modules to perform various functions, such as one or more processor cores 1331, one or more memories 1332, an input receiver/signal processing module to process receive marker device reply signals and/or utility locator signals to generate information associated therewith. Further modules may include display and/or user input/output modules 1334 to provide output audio or visual displays (e.g., via a speaker and/or LCD panel) user input (e.g., via buttons, touchscreens, mice, etc.). One or more data communications modules 1335 may be included to facilitate data communications, via module or modules 1350, with external devices or systems, such as notebook computers, tablets, cellular phones, mobile base stations, remote server systems, and the like. Processing element 1330 may include an output signal generation module for use in conjunction with marker device excitation transmitter module 1310 to send marker device excitation signals, which will typically be continuous and may optionally include modulation.

The memory 1332 (and/or other external memory or data storage elements, not shown) may store the information associated with the buried utility and/or the marker device. In typical operation, the marker device excitation signal is sent continuously, but may be sent at least partially simultaneously to receiving the buried utility signal during at least some buried utility or marker device reply signal reception time windows. As noted previously, the marker device excitation signal may be sent in a continuous or substantially continuous fashion during the duration or powering of the system or, in some embodiments, during a subset of the system operating interval. Data and/or other information or signal coding or modulation may be included in the excitation signal.

The marker device excitation signal 1300 may, for example, be sent at a first frequency, and the marker device reply signal (e.g., one of signals 1325) may be received at front end module 1320 at a second frequency that is different from the first frequency. The first frequency and the second frequency may be synchronized with each other. The first and second frequencies may be related by an integer multiple or divisor, such as is described with respect to the marker device embodiments herein (e.g., using a divider circuit in a microcontroller in the marker device to divide-down received signal frequencies). The synchronization may be done by using the received signal frequency for generation of a clock for the microcontroller. In typical embodiments, the excitation signal may be selected so as to be out of band with tuned receiver frequencies to further reduce interference. In addition, the received frequency may be selected so as to be substantially different from the excitation frequency. In addition, the marker excitation frequency may be selected such that it is above a defined Nyquist frequency of analog-to-digital converters in the receiver front end or subsequent circuits (e.g., element 320 of FIG. 3) to provide potential performance enhancement in the receiver and processing elements.

As noted elsewhere herein, the excitation frequency may be chosen such that an integer multiple or divisor can be used for the marker device reply signal, for example, in implementations where the marker device uses a clock frequency generated based on the received excitation signal frequency as described herein. In typical configurations, both active and passive locating (e.g., locating based on actively energized buried utilities (e.g., using a buried utility transmitter) and passive (e.g., based on inherent current flow in the utility from electrical wires, radio-induced signals, etc.) can be performed in the receiver front end and processing element simultaneously with excitation of marker devices and receiving corresponding marker device reply signals. In addition, in some embodiments where multiple marker devices are present, the marker device reply signals may be sent in randomly generated time windows so as not to interfere with each other and therefore allow the locator to identify multiple marker devices within a given excitation signal radius.

The front end subsystem 1320 may, for example, include antennas and analog or digital electronics to receive and process utility generated magnetic field signals and/or marker device reply signals. The front end subsystem may include an antenna coil and a circuit coupled to the output terminal of the antenna coils. The antenna coil may be part of a nested antenna coil configuration for providing omni-directional antenna coverage. Examples of such elements and configurations are described in the incorporated applications. A circuit coupled to the output of the antenna coils may be configured to present substantially a short circuit at the marker device excitation signal frequency and/or other frequencies of actual or potentially interfering signals, e.g., as shown in FIG. 10. The circuit coupled to the output terminals of the antenna coils may include a series LC circuit coupled across the output terminals as shown in FIG. 10.

The system 1300 may further include a positioning system module 1360 to generate output data corresponding to a location or position of the system, such as the location of an integrated locator marker device excitation transceiver, and provide this information to the processing element 1330. The positioning system module 1360 may be a satellite positioning system module to receive positioning signals 1362 as shown. The positioning system module may alternately or in addition be a terrestrial-based positioning system module. The positioning system module may be an inertial-based positioning system module. The satellite positioning system module may be a GPS module, Galileo system module, GLONASS module, or other satellite-based positioning system module.

The system 1300 may include a display device or element 1370, such as an LCD or other visual display device. The display device 1370 may display information associated with the buried utility and/or information associated with the marker device as provided from display module 1334 of processing element 1330. The displayed information may include one or more of buried utility depth, buried utility location (e.g., relative to the ground and/or earth-based coordinates such as latitude/longitude, tilt, presence of multiple utilities, current flow, etc.), marker device serial number or device identification number, other data provided from the marker device, such as position data or environmental condition data, and/or other information associated with the buried utility and/or marker device. The system may further include an audible output element (not shown), such as a speaker, headphones and headphone jacks/connectors, buzzers, or other audio output elements.

The marker device excitation transmitter module 1310 may include an output signal oscillator circuit, a coil antenna, and a tank circuit coupled in series to the coil antenna and the oscillator circuit, such as described previously herein. The tank circuit may be configured to increase the Q of the coil antenna at the marker device excitation signal frequency. The tank circuit may include an inductor having an inductance of approximately an order of magnitude or more than the inductance of the antenna coil at the marker device excitation frequency. The tank circuit may include a capacitor in series with the inductor. The capacitor and inductor may be tuned to resonance, in conjunction with the antenna inductance, at approximately the marker device excitation frequency.

Figure 14:
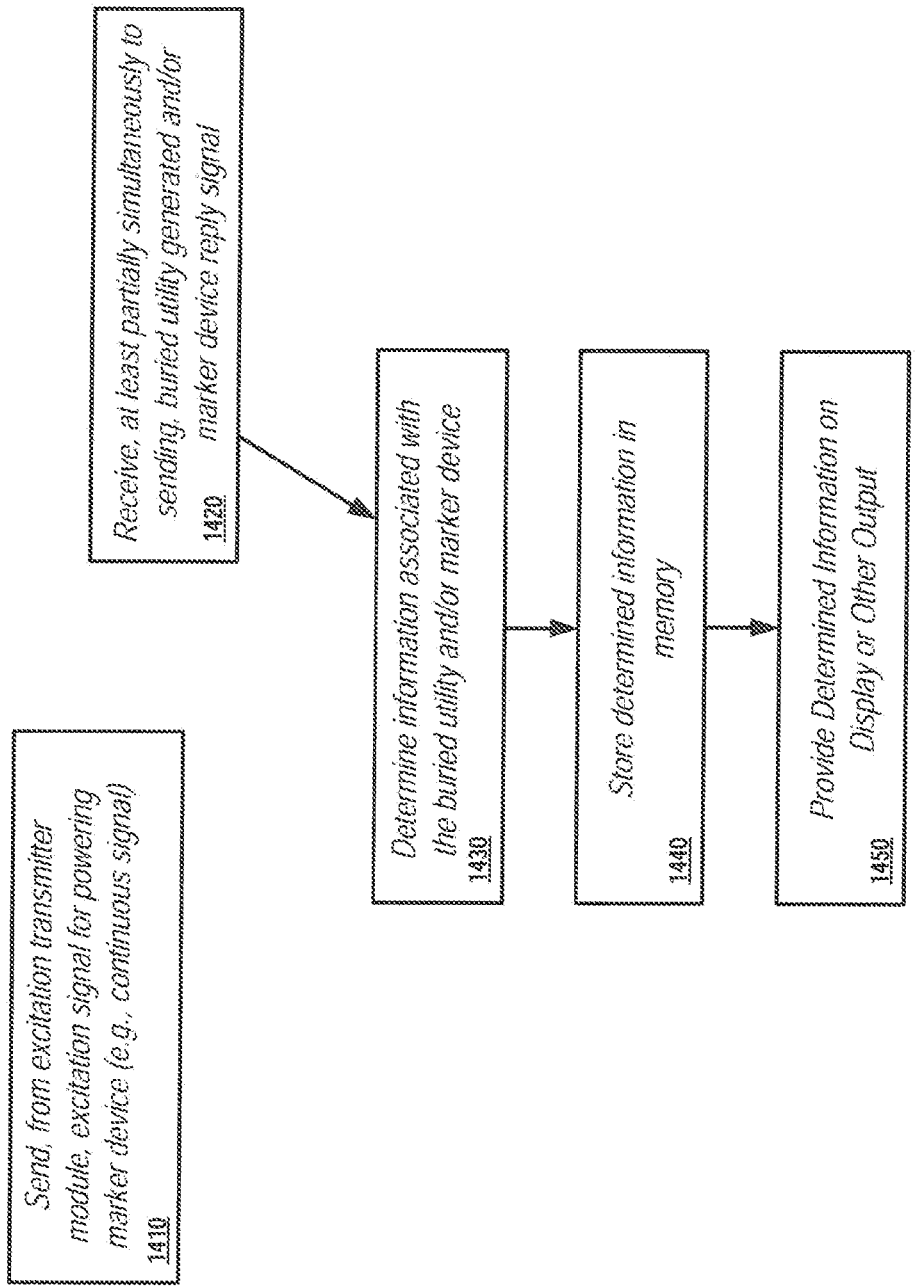
FIG. 14 illustrates details of an embodiment of an integrated locator operational method.

FIG. 14 illustrates details of an embodiment of a method 1400 for operating a device such as an integrated locator during a locate operation. Method 1400 may include, for example, a stage 1410 of sending, from an excitation transmitter module, which may be disposed in or coupled to an integrated locator or marker device excitation transceiver, an excitation signal for powering a marker device. The excitation signal may be sent in a continuous or substantially continuous fashion during locate operations in a typical embodiment. At stage 1420, signals from either a buried utility, marker device reply, or both may be received, with the reception done at least partially simultaneous to at least part of the sending an excitation signal. The signals may be received in a front end subsystem of an integrated locator or marker device excitation transceiver, and may be a from one or more of 1) a buried utility and 2) a reply signal from a marker device powered by the excitation signal. The method may further include, at stage 1430, determining, in a processing element, information associated with the buried utility magnetic field signal, the reply signal, or both. The method may further include at stage 1440, storing the determined information in a memory.

The device may be a utility locator, and the excitation transmitter module may be integrated with the utility locator. The receiving, determining, and/or storing may be performed in the utility locator. The device may be a utility locator and the excitation transmitter module may be coupled to, rather than integrated with, the utility locator. The receiving, determining, and/or storing stages may be performed at least in part in the utility locator. The device may, for example, be a marker device excitation transceiver. The sending, receiving, determining, and/or storing may be performed in one or more modules of the marker device excitation transceiver.

The receiving stage 1420 may include receiving a buried utility magnetic field signal. The determining information may include determining a depth of the buried utility. The determining information stage 1430 may include determining a position, relative to the ground surface, of the buried utility. The method may further include an optional stage (not shown) of receiving a positioning system signal and determining a location of the device, such as with earth-based coordinates such as latitude/longitude coordinates. The associating may further include a stage of associating the determined information with the location of the device.

The receiving stage 1420 may include receiving a marker device reply signal. The determining information stage 1430 may include determining a serial number of device identification number.

The receiving stage 1420 may include receiving a buried utility magnetic field signal, and the determining information may include one or both of determining a depth of the buried utility and determining a position, relative to the ground surface, of the buried utility. The receiving stage 1420 may further include receiving a marker device reply signal, and the determining information stage 1430 may further include determining a serial number or a device identification number of the marker device.

The method 1400 may further include a stage 1450 of providing, on a display of the device, at least a portion of the determined information. The display may include displayed information on a graphical user interface (GUI). The displayed information may include a depiction of the buried utility, a depth of the buried utility, location of a marker device, serial number or device ID of the marker device, and/or other information associated with the buried utility and/or marker device.

The method 1400 may further include an optional stage (not shown) of sending, from the device, the determined information to another device or system. The sending may be via a wired or wireless communications link, such as shown in FIG. 13. The sending may be done from a wired or wireless communications module or module in a locator or marker device excitation transceiver such as shown in FIG. 13. The wired or wireless communications link may be one or more of a USB connection, a Wi-Fi connection, an Ethernet connection, a cellular data connection, and an ISM connection using a corresponding module or modules. The another device may be a cellular phone or other cellular data transceiver device. The another device may be a remote computer server system. The another device may be a notebook computer or tablet device. The another device may be a mobile base station.

In some configurations, the apparatus, circuit, modules, or systems described herein may include means for implementing features or providing functions described herein related to integrated locators, marker devices, marker device excitation transceivers, and related devices, components, methods, and systems. In one aspect, the aforementioned means may be a module comprising a processing element including a processor or processors, associated memory and/or other electronics in which embodiments of the invention reside, such as to implement signal reception, signal processing, switching, signal transmission, or other functions to process and/or condition transmitter outputs, locator inputs, filter received signals, and/or provide other electronic functions described herein. These may be, for example, modules or apparatus residing in buried object integrated locators, marker devices, marker device excitation devices or receiver devices, and/or other related equipment, devices, or systems.

In one or more exemplary embodiments, the electronic functions, methods and processes described herein and associated with integrated locators and marker devices may be implemented in hardware, software, firmware, or any combination thereof, which may be in one or more processing elements. If implemented in software, the functions may be stored on or encoded as one or more instructions or code on a non-transitory computer-readable medium. Computer-readable media includes computer storage media or memory devices. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed herein are examples of exemplary approaches. Based upon design preferences, it is understood that the specific order or hierarchy of steps in the processes may be rearranged while remaining within the scope of the present disclosure unless noted otherwise.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Skilled artisans may implement the described functionality in varying ways for each particular application, but such implementation decisions should not be interpreted as causing a departure from the scope of the present disclosure.

The various illustrative functions and circuits described in connection with the embodiments disclosed herein may be implemented or performed in a processing element with a general purpose processor, a digital signal processor (DSP), an application specific integrated circuit (ASIC), a field programmable gate array (FPGA) or other programmable logic device, discrete gate or transistor logic, discrete hardware components, memory devices, and/or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The present invention is not intended to be limited to the aspects shown herein, but is to be accorded the full scope consistent with the Specification and Drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use various embodiments of the presently claimed invention. Various modifications to these aspects will be readily apparent to those skilled in the art, and the generic principles defined herein may be applied to other aspects without departing from the spirit or scope of the invention. Therefore, the presently claimed invention is not intended to be limited to the aspects and details shown herein, but is to be accorded the widest scope consistent with this appended Claims and their equivalents.

We claim:

1. An integrated buried utility locator system for locating buried utilities using magnetic sensing while simultaneously receiving marker device signals, comprising:

a marker device excitation transmitter module for generating and sending a marker device radio frequency excitation signal at a marker device excitation signal frequency;

a utility locator front end subsystem to simultaneously receive a magnetic field signal emitted from a buried utility resulting from AC current flowing therein and a radio frequency magnetic field reply signal from a marker device responsive to the excitation signal;

a processing element for processing the received buried utility signals and marker device reply signal and generating information associated with the buried utility, including depth and/or positional information of the buried utility, and information associated with the marker device, including depth and/or positional information of the marker device, based on the received buried utility signal and marker device reply signal; and a non-transitory memory for storing the information associated with the buried utility and the marker device;

wherein the marker device excitation signal is sent at least partially simultaneously to receiving the buried utility signal.

2. The system of claim 1, wherein the marker device excitation signal is sent at a first frequency and the marker device reply signal is received at a second frequency lower than the first frequency.

3. The system of claim 1, wherein the locator front end subsystem includes an antenna coil and a circuit coupled to the output terminal of the antenna coils, wherein the circuit coupled to the output of the antenna coils is configured to present substantially a short circuit at the marker device excitation signal frequency and a normal locator input impedance at the marker device and buried utility locator signal frequencies.

4. The system of claim 3, wherein the circuit coupled to the output terminals of the antenna coils includes a series LC circuit coupled across the output terminals.

5. The system of claim 1, further comprising a positioning system module configured to generate output data corresponding to a location or position of the locator.

6. The system of claim 5, wherein the satellite positioning system module is a GPS module.

7. The system of claim 1, wherein the marker device excitation transmitter module comprises:
   an output signal oscillator circuit;
   a coil antenna; and
   a tank circuit coupled in series to the coil antenna and the oscillator circuit;
   wherein the tank circuit is configured to increase the Q of the coil antenna at the marker device excitation signal frequency.

8. The system of claim 7, wherein the tank circuit comprises an inductor having an inductance of approximately an order of magnitude or more than the inductance of the antenna coil at the marker device excitation frequency.

9. The system of claim 7, wherein the tank circuit comprises a capacitor in series with the inductor, the capacitor and inductor tuned to resonance, in conjunction with the antenna inductance, at approximately the marker device excitation frequency.

10. A marker device for use with an integrated buried utility locator system, comprising:
    an antenna for receiving an excitation signal at an excitation signal frequency and sending a reply signal at a reply signal frequency lower than the excitation signal frequency;
    an input module coupled to the antenna;
    a clock circuit coupled to the input module to generate a clock signal at a frequency synchronized to the received excitation signal;
    a power supply circuit coupled to the input module to generate an output power signal from the received excitation signal;
    a processing element for generating an output signal at an output signal frequency synchronized with the clock signal frequency and different from and lower in frequency than the excitation signal frequency; and
    an output module for receiving the output signal from the processing element and providing the output signal to the antenna for transmission.

11. The marker device of claim 10, wherein the antenna is a coil antenna having two outputs and the input module comprises an LC tank circuit coupled across the output of the antenna coil.

12. The marker device of claim 10, wherein the clock circuit comprises a parallel LC circuit in series with a first capacitor and a second capacitor.

13. The marker device of claim 10, wherein the power supply circuit comprises a diode and a filter capacitor.

14. The marker device of claim 10, wherein the processing element comprises a microcontroller having programmed instructions to generate the output signal.

15. The marker device of claim 14, wherein the programmed instructions include instructions to generate a modulated output signal.

16. The marker device of claim 15, wherein the modulated output signal is phase shift keying (PSK) modulated with data.

17. The marker device of claim 16, wherein the data includes a serial number of the marker device.

18. The marker device of claim 16, wherein the data includes data defining a location or position of the marker device.

19. The marker device of claim 17, wherein the output module includes a tank circuit tuned to approximately the output frequency.

20. A method for performing a locate operation with an integrated buried utility locator system, comprising: sending, from an excitation transmitter module integral with a utility locator, a radio frequency magnetic field excitation signal for powering a marker device; receiving, simultaneous to at least part of the sending an excitation signal, in a front end subsystem of the locator and without overloading the front end subsystem with the excitation signal, a radio frequency magnetic field signal sent from 1) a buried utility generated from AC current flowing therein; and 2) a radio frequency magnetic field reply signal from a marker device powered by the excitation signal; determining, in a processing element, information associated with the buried utility including position and/or depth information based on the radio frequency magnetic field signal generated from the buried utility and information including position and/or depth information of the marker device based on the radio frequency reply signal; and storing the determined information in a non-transitory memory.

21. The method of claim 20, wherein the receiving, determining, and storing are performed in the utility locator.

22. The method of claim 20, wherein the receiving comprises:
    receiving a buried utility magnetic field signal and the determining information comprises determining a depth of the buried utility; and receiving a marker device reply signal and the determining information comprises determining a serial number of device identification number.

23. The method of claim 20, wherein the receiving comprises:
   receiving a buried utility magnetic field signal and the determining information comprises one or both of determining a depth of the buried utility and determining a position, relative to the ground surface, of the buried utility; and
   receiving a marker device reply signal and the determining information further comprises determining a serial number of device identification number.

24. The system of claim 5, wherein the marker device excitation signal is selectively sent responsive to generated output data corresponding to a location or position of the locator corresponding to mapped marker device data.

25. The system of claim 24, wherein the positioning system module is a GPS module, and wherein the generated output data is latitude longitude coordinate data associated with the mapped marker device data.

26. The system of claim 5, wherein the marker device excitation transmitter module is selectively powered responsive to generated output data corresponding to a location or position of the locator corresponding to mapped marker device data.

* * * * *